US012692408B2

(12) United States Patent
Appel et al.

(10) Patent No.: US 12,692,408 B2
(45) Date of Patent: Jul. 28, 2026

(54) POLYMER FORMULATIONS FOR ANTI-FOULING HYDROGEL COATINGS

(71) Applicant: The Board of Trustees of the Leland Stanford Junior University, Stanford, CA (US)

(72) Inventors: Eric Andrew Appel, Stanford, CA (US); Doreen Chan, Los Angeles, CA (US); Hyongsok Soh, Palo Alto, CA (US); Jun-Chau Chien, Berkeley, CA (US); Eneko Axpe Iza, San Francisco, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 645 days.

(21) Appl. No.: 17/789,403

(22) PCT Filed: Jan. 9, 2021

(86) PCT No.: PCT/US2021/012862

§ 371 (c)(1),
(2) Date: Jun. 27, 2022

(87) PCT Pub. No.: WO2021/142391

PCT Pub. Date: Jul. 15, 2021

(65) Prior Publication Data

US 2023/0038845 A1 Feb. 9, 2023

Related U.S. Application Data

(60) Provisional application No. 62/959,599, filed on Jan. 10, 2020.

(51) Int. Cl.
*C09D 133/26* (2006.01)

(52) U.S. Cl.
CPC .................................. *C09D 133/26* (2013.01)

(58) Field of Classification Search
CPC .................................................... C09D 133/26
See application file for complete search history.

(56) References Cited

U.S. PATENT DOCUMENTS 6,248,806 B1 6/2001 Codolar
6,458,878 B1 10/2002 Tsuboi
(Continued)

FOREIGN PATENT DOCUMENTS

WO WO2008089032 7/2008
WO WO2014118779 8/2014
WO WO2017209029 12/2017

OTHER PUBLICATIONS

Hydrogels in healthcare (Year: 2013).*
(Continued)

*Primary Examiner* — Catherine S Branch
*Assistant Examiner* — Huihong Qiao
(74) *Attorney, Agent, or Firm* — LUMEN PATENT FIRM

(57) ABSTRACT

Fouling on the surface of biomaterials and medical devices by proteins and microorganisms in the body severely hinders device functionality and drastically shortens lifetime. Currently, there is high demand for coatings that mitigate this biofouling. In this invention, the use of polyacrylamides has been explored in hydrogel coatings by building the largest library of acrylamide-based copolymer anti-biofouling hydrogels (>160 combinations) to date. A combinatorial approach was used, exploiting the ease of hydrogel synthesis to examine a high-throughput screening of platelet adhesion, precursor to thrombosis and a common culprit in biofouling. Applicability has been demonstrated of top-performing polyacrylamide-based hydrogel by (i) coating affinity-based electrochemical biosensors in vitro in a whole blood assay,
(Continued)

and (ii) through coating an electrochemical aptamer-based device for real-time monitoring of analytes in an in vivo closed-loop system.

7 Claims, 32 Drawing Sheets

(56) References Cited

U.S. PATENT DOCUMENTS

| | | | | |
|---|---|---|---|---|
| 8,545,951 | B2 * | 10/2013 | Yahiaoui ................ | B29D 22/00 428/357 |
| 11,202,849 | B2 | 12/2021 | Kitagawa | |
| 2003/0087111 | A1 | 5/2003 | Hubbell | |
| 2006/0165934 | A1 | 7/2006 | Okazaki | |
| 2008/0264867 | A1 * | 10/2008 | Mika ........................ | B01J 20/28 210/679 |
| 2008/0305292 | A1 | 12/2008 | Okazaki | |
| 2011/0052788 | A1 | 3/2011 | Messersmith | |
| 2017/0190844 | A1 | 7/2017 | Zeng | |
| 2018/0147326 | A1 | 5/2018 | Kizhakkedathu | |
| 2020/0215226 | A1 | 7/2020 | Kitagawa | |

OTHER PUBLICATIONS

HEAA dual functional hydrogel (Year: 2013).*

Anti-fouling hydrogel for cell culture (Year: 2015).*

Xhao et al. Antifouling and biodegradable poly(N-hydroxyethyl acrylamide) (polyHEAA)-based nanogels. RSC Adv. 2013, 3, 19991-20000.

Chan et al. Combinatorial Polyacrylamide Hydrogels for Preventing BioFouling on Implantable Biosensors. bioRxiv Dec. 18, 2020, pp. 1-54.

* cited by examiner acrylamides gold standards and controls

| Physical/Mechanical Property | Technique | Value (Mean ± S.D.) |
|---|---|---|
| G' | Rheology | 29.8 ± 3.0 kPa |
| G" | Rheology | 4.8 ± 1.2 kPa |
| E | Nanoindentation | 1.0 ± 0.1 MPa |
| E | Tensile Test | 1.9 ± 0.2 kPa |
| Toughness | Tensile Test | 0.92 ± 0.42 J/m$^3$ |
| Strain at Break | Tensile Test | 35.1 ± 6.0 % |
| Mesh Size | FRAP | 2.3 ± 0.1 nm |

FIG. 5A

FIG. 5F
Young's Modulus (MPa)
$10^4$
$10^3$
$10^2$
$10^1$
$10^0$
$10^{-1}$
stiffness of human arteries
PU
SR
PTFE
PVC
PET
PVDF
Parylene
PMMA
F50-C50

POLYMER FORMULATIONS FOR ANTI-FOULING HYDROGEL COATINGS

FIELD OF THE INVENTION

This invention relates to antifouling coatings for surfaces of biomaterials and medical devices that are used in the body.

BACKGROUND OF THE INVENTION

Biomaterials and medical devices improve the quality of life and extend the lifespan for millions of people worldwide. Yet, when introduced in the body of a patient, the non-specific absorption of proteins and small molecules, or biofouling, occludes these materials due to the adhesion and aggregation of platelets from flowing blood, significantly shortening device lifetime. For instance, catheters show signs of fouling within 24 hours and are no longer functional within 7 days. Electronics such as implantable enzymatic biofuel cells and sensors also last only a few months, yet the intended lifetime of these biomaterials is on the order of years. Once these materials foul, invasive surgeries are often required to replace the materials, which can be high risky and costly procedures, and a significant increase to patient burden. Biomaterials are often functionalized to address the biofouling problem. Active functionalization strategies such as drug-eluting or lubricant-infused materials, reduce adhesion and activation of platelets and thrombosis. However, these materials suffer from many limitations, including failure to give a controlled dosage, offering only short-term benefit due to the eventual depletion of the active molecules from the functionalized material, and potentially leading to major bleeding in patients.

On the other hand, passive coating strategies that modify the chemistry at the interface of the materials and bodily fluid have the potential to be scalable, flexible, cheap, and require no lithography. The "gold standard" materials for passive coating strategies are poly(ethylene glycol) (PEG) and its derivatives which form a tight hydration layer with water through hydrogen bonding that is hypothesized to contribute to non-fouling properties. Nonetheless, the use of PEG for anti-biofouling purposes presents several issues: (i) PEG is immunogenic, and therefore provokes humoral and/or cell-mediated immune responses, (ii) it does not prevent entirely platelet adhesion, and (iii) it is prone to degradation through hydrolysis and auto-oxidation, making it unsuitable for long-term application in biomaterials and medical devices.

Alternatives to PEG have also been introduced, aimly zwitterionic polymers, fluoro- and acylate-based molecules and polyglycidols, yet these also face issues of degradation and adverse immune responses, or have limited efficacy.

Accordingly, there is a need for the introduction and development of new materials to combat biofouling.

SUMMARY OF THE INVENTION

The present invention provides an anti-fouling hydrogel coating having a polymerized composition containing monomers, alone or in combinations, having a combined weight ratio of 100% with a general form of:

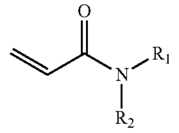

R1 and R2 are substituents of monomers selected from the group N,N-dimethylacrylamide, 4-acryloylmorpholine, N-[3-(dimethylamino)propyl]meth-acrylamide, 2-acrylamido-2methyl-propanesulfonic acid, or N-isopropylacrylamide. A first monomer and a second monomer together make up the combined 100% weight ratio having individual weight ratios or at least binary combined weight ratios. Embodiments of weight ratios are provided herein. Addressing the problems in the art, the anti-fouling hydrogel coating has relatively better antifouling properties in terms of blood platelet adhesion, tested after protein serum adhesion, than PEG or HEMA.

Fouling on the surface of biomaterials and medical devices by proteins and microorganisms in the body severely hinders device functionality and drastically shortens lifetime. Currently, there is high demand for coatings that mitigate this biofouling. This invention explored the use of polyacrylamides in hydrogel coatings by having a library of acrylamide-based co-polymer anti-biofouling hydrogels (>160 combinations). A combinatorial approach was used, exploiting the ease of hydrogel synthesis to examine a high-throughput screening of platelet adhesion, precursor to thrombosis and a common culprit in biofouling. The inventors demonstrated applicability of top-performing polyacrylamide-based hydrogel by (i) coating affinity-based electrochemical biosensors in vitro in a whole blood assay, and (ii) through coating an electrochemical aptamer-based device for real-time monitoring of analytes in an in vivo closed-loop system.

In one embodiment, a library of unique and novel hydrogel formulations is provided containing acrylamide-based monomers that can be synthesized and used as a coating for reduction and/or prevention of fouling on substrates. The formulation contains an anti-fouling combinatorial polymer formulation, with a cross-linker and photo-initiator whose composition can resist protein adsorption, cell and platelet adhesion. Formulations of unique combinations of acrylamide monomers are provided, that once polymerized, exhibit anti-fouling properties that are highly applicable coatings to a variety of (medical) devices. Combinatorial copolymerization of the two acrylamide monomers in precise mixture provides an approach to an anti-fouling hydrogel coating that can be applied to a variety of devices.

The anti-fouling hydrogel coatings were benchmarked against a so-called golden standard in the art, i.e. PolyEthylene Glycol (PEG) and Poly(Hydroxyethyl)MethAcrylate (HEMA). FIGS. 8-21 show different antifouling compositions where:

A=acrylamide
B=N,N-dimethylacrylamide
C=N,N-diethylacrylamide
D=N-(3-methoxypropyl)acrylamide
E=N-hydroxymethyl-acrylamide
F=N-hydroxyethyl-acrylamide
G=N-[Tris(hydroxymethyl)methyl]acrylamide
H=4-acryloylmorpholine
I=N-[3-(dimethylamino)propyl]methacrylamide
J=2-acrylamido-2-methylpropanesulfonic acid
K=N-isopropylacrylamide Individual data points represent an antifouling polymer obtained by a polymerized composition containing monomers, alone or in combinations, having a combined weight ratio of 100% with a general form of:

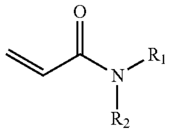

R1 and R2 are substituents of monomers selected from the group N,N-dimethylacrylamide, 4-acryloylmorpholine, N-[3-(dimethylamino)propyl]methacrylamide, 2-acrylamido-2-methylpropanesulfonic acid, or N-isopropylacrylamide. A first monomer and a second monomer together making up the combined 100% weight ratio having individual weight ratios or at least binary combined weight ratios as defined below. Using the so-called golden standard of PEG and HEMA anti-fouling polymers have been identified as performing significantly better than the golden standard (as can be depicted from the individual figures in FIGS. 8-21):

100 to 0 weight % of C and 0 to 100 weight % of F,
100 to 0 weight % of B and 0 to 100 weight % of H,
100 to 0 weight % of D and 0 to 100 weight % of H,
100 to 0 weight % of D and 0 to 100 weight % of F,
100 to 0 weight % of A and 0 to 100 weight % of D,
100 to 0 weight % of A and 0 to 100 weight % of C,
100 to 50 weight % of C and 0 to 50 weight % of G or 82.1 to 100 weight % of G to 17.9% to 0% of C,
100 to 58.7 weight % of A and 0 to 41.3 weight % of G or 41.3 to 0 weight % of A and 58.7 to 100 weight % of G,
100 to 17.0 weight % of A and 0 to 83.0 weight % of B,
100 to 0 weight % of A and 0 to 100 weight % of E,
100 to 58.7 weight % of A and 0 to 41.3 weight % of F or 41.3 to 0 weight % of A and 58.7 to 100 weight % of F,
100 to 0 weight % of A and 0 to 100 weight % of H,
100 to 0 weight % of A and 0 to 100 weight % of I,
100 to 75 weight % of A and 0 to 25 weight % of J or 60.3 to 7.0 weight % of A and 39.7 to 93.0 weight % of J,
100 to 20.0 weight % of A and 0 to 80.0 weight % of K,
100 to 97.2 weight % of B and 0 to 2.8 weight % of C or 71.7 to 93.5 weight % of C and 28.3 to 6.5 weight % of B,
100 to 95.8 weight % of B and 0 to 4.2 weight % of D or 68.3 to 100 weight % of D and 31.7 to 0 weight % of B,
100 to 93.7 weight % of B and 0 to 6.3 weight % of E or 66.6 to 87.5 weight % of E and 33.4 to 12.5 weight % of B,
100 to 58.9 weight % of B and 0 to 41.1 weight % of F or 91.6 to 100 weight % of F and 8.4 to 0 weight % of B,
100 to 95.7 weight % of B and 0 to 4.3 weight % of I or 70.9 to 100 weight % of I and 29.1 to 0 weight % of B,
100 to 92.0 weight % of B and 0 to 8.0 weight % of K or 63.5 to 14.2 weight % of B and 36.5 to 85.8 weight % of K,
100 to 62.5 weight % of C and 0 to 37.5 weight % of D or 69.4 to 100 weight % of D and 30.6 to 0 weight % of C,
100 to 8.9 weight % of C and 0 to 91.1 weight % of E,
15.6 to 0 weight % of C and 84.4 to 100 weight % of H,
0 to 34.7 weight % of C and 65.2 to 100 weight % of I,
100 to 58.0 weight % of C and 0 to 42.0 weight % of J,
100 to 72.9 weight % of D and 0 to 27.1 weight % of E or 27.8 to 17.8 weight % of D and 72.2 to 82.2 weight % of E,
100 to 0 weight % of D and 0 to 100 weight % of F,
100 to 0 weight % of D and 0 to 100 weight % of G,
100 to 0 weight % of D and 0 to 100 weight % of I,
100 to 65.7 weight % of D and 0 to 34.3 weight % of J or 33.6 to 6.4 weight % of D and 66.4 to 93.6 weight % of J,
100 to 75 weight % of D and 0 to 25 weight % of K,
88.9 to 60.6 weight % of E and 11.1 to 39.4 weight % of F or 14.2 to 0 weight % of E and 85.8 to 100 weight % of F,
70.5 to 0 weight % of E and 29.5 to 100 weight % of G,
33.7 to 0 weight % of E and 66.3 to 100 weight % of H,
90.7 to 74.8 weight % of E and 9.3 to 25.2 weight % of I or 31.9 to 0 weight % of E and 68.1 to 100 weight % of I,
92.6 to 68.9 weight % of E and 7.4 to 31.1 weight % of J,
92.2 to 48.2 weight % of E and 7.8 to 51.8 weight % of K,
100 to 90.6 weight % of F and 9.4 to 0 weight % of G or 56.6 to 0 weight % of F and 43.4 to 100 weight % of G,
100 to 0 weight % of F and 0 to 100 weight % of H,
100 to 97.6 weight % of F and 0 to 2.4 weight % of I or 39.1 to 0 weight % of F and 60.9 to 100 weight % of I,
100 to 97.2 weight % of F and 0 to 2.8 weight % of J or 29.2 to 7.5 weight % of F and 39.1 to 92.5 weight % of J,
100 to 17.8 weight % of F and 0 to 82.2 weight % of K,
100 to 88.8 weight % of G and 0 to 11.2 weight % of H or 6.5 to 0 weight % of G and 93.5 to 100 weight % of H,
100 to 62.9 weight % of G and 0 to 37.1 weight % of I or 19.7 to 0 weight % of G and 80.3 to 100 weight % of I,
100 to 29.0 weight % of G and 0 to 71.0 weight % of J,
100 to 33.6 weight % of G and 0 to 66.4 weight % of K,
100 to 90.2 weight % of H and 0 to 9.8 weight % of I or 4.9 to 0.0 weight % of H and 95.1 to 100 weight % of I,
100 to 6.7 weight % of H and 0 to 93.3 weight % of J,
100 to 17.1 weight % of H and 0 to 82.9 weight % of K,
100 to 11.3 weight % of I and 0 to 88.7 weight % of J,
100 to 62.5 weight % of G and 0 to 37.5 weight % of K,
87.9 to 68.9 weight % of J and 12.1 to 31.1 weight % of K or 28.4 to 21.4 weight % of J and 71.6 to 78.6 weight % of K, or
100 to 96.0 weight % of B and 0 to 4.0 weight % of G or 44.1 to 0 weight % of B and 55.9 to 100 weight % of G, again where:
A=acrylamide, B=N,N-dimethylacrylamide, C=N,N-diethylacrylamide, D=N-(3-methoxypropyl)acrylamide, E=N-hydroxymethyl-acrylamide, F=N-hydroxyethyl-acrylamide, G=N-[Tris(hydroxymethyl)methyl]acrylamide, H=4-acryloylmorpholine, I=N-[3-(dimethylamino)propyl]methacrylamide, J=2-acrylamido-2-methylpropanesulfonic acid, and K=N-isopropylacrylamide.

The antifouling coatings can be used and are adaptable for a variety of substrates. They can be attached in a variety of ways as a hydrogel coating. One method is through hydrogel coating that uses the specified ratio of monomers. The total weight formulations of these monomers, cross-linker and cross-linking density, and photo-initiator may also vary. Brush polymers containing these formulations may also be used will variations in the brush length and brush density. The polymeric coating can be used on medical devices or materials in contact with blood or bodily fluids to prevent fouling. Examples are, but not limited to, include blood contacting catheters, silicone implants, vascular grafts, pacemakers, and surgical implants.

This material formulations provided in this invention provide advantages in stability, lifetime, biocompatibility and anti-fouling properties. These formulations provide an improvement over these limitations and thus extend the lifetime and efficacy of the materials on which they are applied. While other materials have been developed, these previous materials are limited, exhibiting instability, short lifetimes, and immunogenicity. Current materials being employed, such as polymers containing Poly(Ethylene Glycol) and zwitterionic moieties are subject to hydrolysis, undergo autoxidation, and are immunogenic. Assays that have assessed these materials poorly mimic the biological system as they test one or a few proteins or bacterial species at a time, which limits their application in practice. These studies (i.e. quantification of bovine serum albumin) demonstration that PEG-based coatings do not reduce protein adsorption below a limit. Many of hydrogel formulations in this invention exhibit higher biocompatibility than existing materials. Other active anti-fouling materials introduce drug-eluting or amphiphobic-liquid infused coatings, which inherently have limited lifetimes, have poorly controlled dosage, and can lead to uncontrolled bleeding in patients.

In another embodiment, a method of preventing biofouling medical devices or materials in contact with blood or bodily fluids, where the anti-fouling hydrogel coating as defined herein is applied to medical devices or materials that will be in contact with blood or bodily fluids.

Noted is that in making the anti-fouling coating, a cross-linker and photo initiator were used. As an example, cross-linker 1 wt % (N,N'-methylenebisacrylamide) and photo-initiator 1 wt % (lithium phenyl-2,4,6-trimethylbenzoylphosphinate). As a person skilled in the art would appreciate, the cross-linker and photo initiator for the process of making the coating may vary. Similarly, a solvent of about, in one example, 78% water was used in the process which could also vary.

BRIEF DESCRIPTION OF THE DRAWINGS

FIG. 1A: Schematic of anti-biofouling coatings. Platelets adhere and aggregate in medical devices and biomaterials in contact with blood, hindering their performance and lifespan. Coating these materials with antibiofouling hydrogel formulations mitigate or prevent biofouling. FIG. 1B: Monomers (blue 110, hydrophilic; red 120, charged; green 130, hydrophobic) employed for the combinatorial approach. A=acrylamide; B=N,N-dimethylacrylamide; C=N,N-diethylacrylamide; D=N-(3-methoxypropyl)acrylamide; E=N-hydroxymethyl-acrylamide; F=N-hydroxyethyl-acrylamide; G=N-[Tris-hydroxymethyl)methyl]acrylamide; H=4-acryloylmorpholine; I=N-[3-(dimethylamino)propyl]methacrylamide; J=2-acrylamido-2methyl-propanesulfonic acid; K=N-isopropylacrylamide; L=polyethylene glycol (PEG); M=2-(methacryloyloxy)ethylphosphorylcholine (PMPC); N=[2-(methacryloyloxy)ethyl]dimethyl(3-sulfopropyl)ammonium hydroxide; O=(hydroxyethyl) methacrylate (HEMA). FIG. 1C: Facile synthesis of polyacrylamide hydrogels with a photointiator (LAP) at hv=350 nm.

FIG. 2A: The hydrogel samples were soaked in 50% serum for 24 h at 37 degrees Celsius in order to ensure protein absorption in the samples. Then, 100 μL of platelet rich plasma (PRP) obtained from centrifuging rat blood, was incubated for 1 h on the surface of the gels. F50-C50 polyacrylamide hydrogel presented significantly less platelet adhesion than PEG. FIG. 2B: Histogram of all observed platelet counts and standard deviation vs median of the count distribution obtained for each polymer. FIG. 2C: Heat mapping of platelet adhesion counts (red being high and green being low; reader is referred to the priority document to which this application claims priority for grayscale to color interpretation of FIGS. 2B-C) on the 20 wt % hydrogel samples. Colors were assigned to the medians obtained in n=3 tests. The samples are ordered by the mass ratio of each polymer in the combination (100/0, 25/75, 50/50, 75/25). Platelet adhesion on control samples (PEG, PMPC, PSBMA, poly(2-hydroxyethyl methacrylate) (PHEMA)) are also shown.

FIG. 3A: Affinity-based electrochemical sensors were incubated in whole blood to monitor oxidation of ferrocyanide species. Fouling on the gold tip affects shape of cyclic voltammetry oxidation and reduction peaks. FIG. 3B: Application of hydrogel coating protects working electrode. FIG. 3C: Electrodes cycled between oxidation and reduction potential of ferrocyanide solution to obtain cyclic voltammetry curves. Representative graphs are shown. FIG. 3D: Anodic peak current can be extracted from cyclic voltammetry curves. FIG. 3E: Normalized signal intensity of devices after biofouling. Data depict mean±S.D., values were analyzed by paired one-tail t test. *$p<0.05$.

FIG. 4A: DNA aptamers functionalized on the tip on Au probes were inserted into a blood vessel through a catheter, binding with high specificity to a target analyte. FIG. 4B: In vivo kinetics of drug binding to membrane protected aptamer probe shows drift and noise from biofouling of the probe. FIG. 4C: In vivo kinetics of drug binding to aptamer probe at varying concentrations of drug after insertion into rat artery. Gray arrows represent a 100 μL injection of 100 mM kanamycin and solid black arrow represents a 200 μL injection of 100 mM kanamycin and 500 μL of 25 mM ampicillin. Orange arrows represent ampicillin injection.

FIGS. 5A-F show according to an exemplary embodiment of the invention mechanical properties of hydrogel coating. FIG. 5A: Table of mechanical properties of top performing hydrogel (F50-C50). FIG. 5B: Rheological properties of hydrogel at 0.1% strain. FIG. 5C: Representative tensile strength data of F50-C50 hydrogel. FIG. 5D: Nanoindentiation can be used to characterize mechanical properties of materials at the nano-scale, describing the local environment as seen by proteins, cells, etc. FIG. 5E: Representative loading/unloading curve of nanoindentiation of hydrogel under wet conditions. FIG. 5F: Range of elastic modulus of hydrogel versus commercially used medically materials, polyurethane (PU), silicone rubbers (SR), polytetrafluoroethylene (PTFE), polyvinyl chloride (PVC), and polyethylene terephthalate (PET), parylene C, and poly(methyl methacrylate) (PMMA). Hydrogel coating is within the range of the elastic modulus of human arteries.

FIG. 7A: Platelet adhesion and activation on the tip of the bare probe. FIG. 7B: Homogenous coating of F50-C50 gel remains visible with less adhesion of platelets. As a large (0.5 μL) droplet was used to coat these tips, gel is present (by eye) on the probe tip. FIG. 7C: Tip of probe coated with PEG hydrogel shows coverage from platelet agglomeration.

DETAILED DESCRIPTION

Figure 1A:
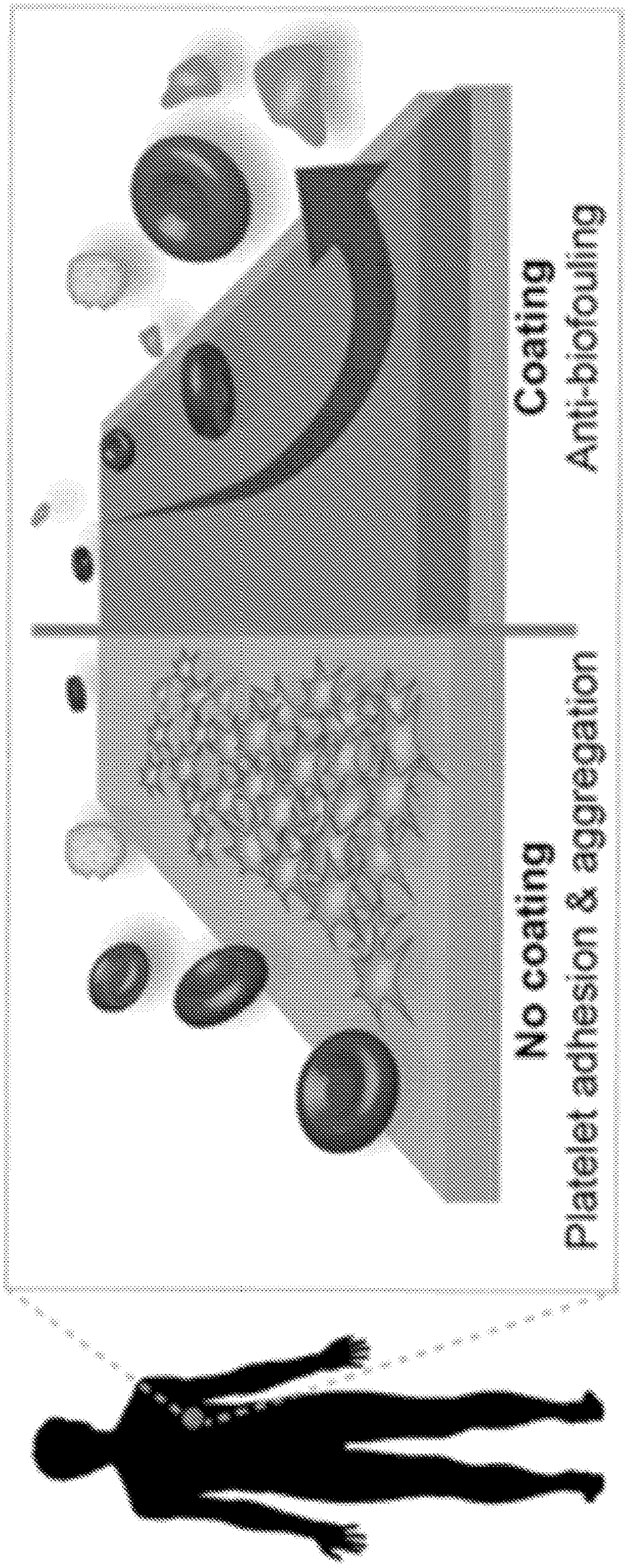
FIGS. 1A-C show according to an exemplary embodiment of the invention polyacrylamide hydrogels as a hydrogel coating to prevent biofouling.

In an exemplary embodiment of this invention the use of inexpensive, commercially available acrylamide monomers was explored that can be polymerized using standard radical polymerization techniques to combat biofouling (FIG. 1A). This ease of polymerization makes them well-suited for use in the development of large combinatorial libraries of materials. For the purposes of this invention an extensive binary combinatorial library was developed to identify a high-performing anti-biofouling formulation for in vitro and in vivo tests. These hydrogel coatings may also be used to improve biocompatibility of materials and devices in contact with the body. Rheology, tensile testing, and nanoindentation show that this hydrogel coating can be used as a coating to mediate the blood-contacting device with surrounding tissue. As proof of concept for medical applications, the top anti-biofouling formulation was applied to coat an electrochemical aptamer device for real-time monitoring of analytes, which are inhibited in vivo due to fouling.

Developing a Library of Anti-Biofouling Polyacrylamide Hydrogels

Figure 1B:
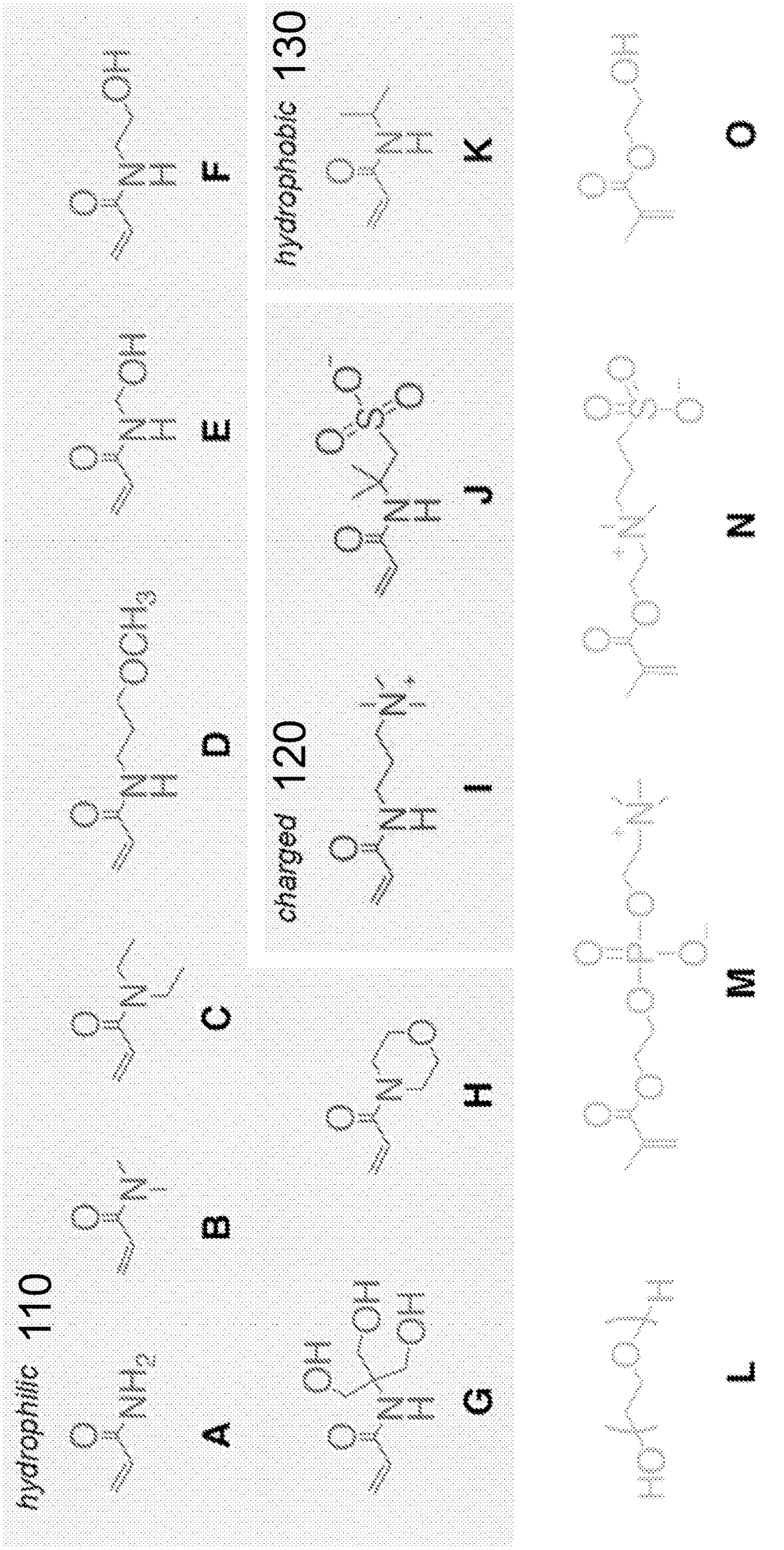
Figure 1C:
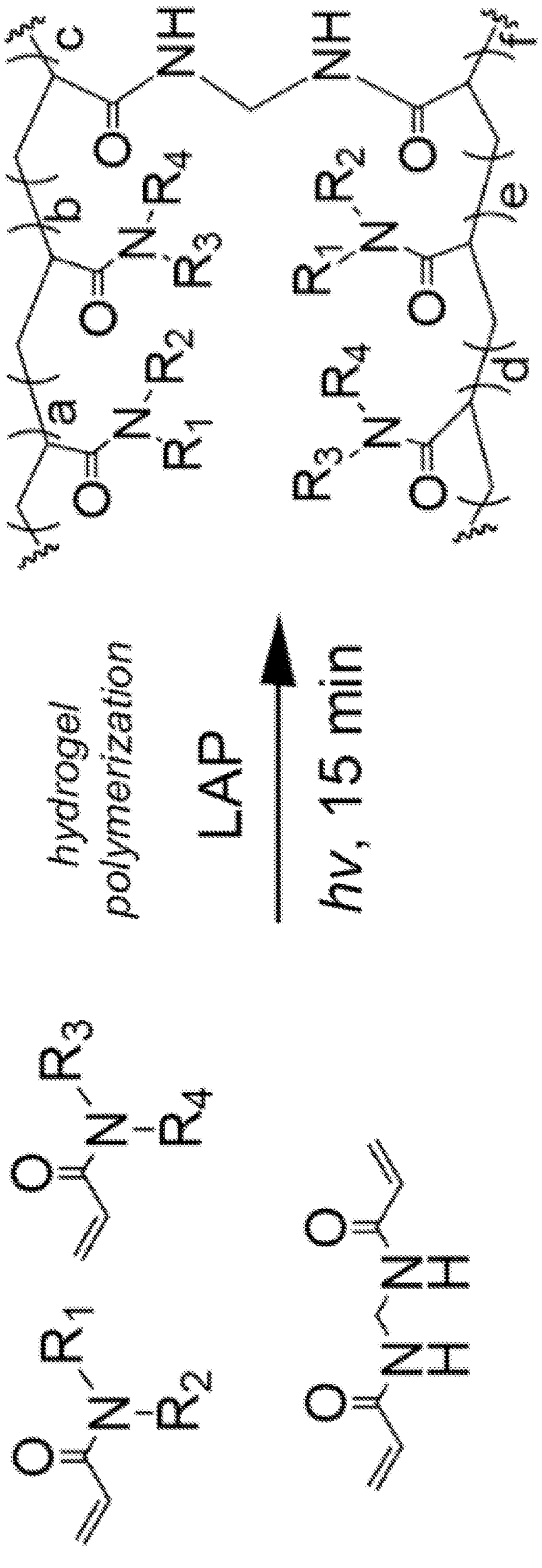

The capability of polyacrylamides as anti-biofouling coatings was investigated. Eleven inexpensive, commercially available acrylamide monomers were selected and binary combinatorial mixtures (100:0, 75:25, 50:50, 25:75) of polyacrylamide hydrogels were fabricated (FIG. 1B). 20 wt % monomer formulations were chosen to mimic stiffness of a human vein or artery, without making the gels brittle, yielding 171 unique combinations of polymer hydrogels (FIG. 1C). The reactivity of acrylamides leads to random copolymerizations ($r_1r_2 \approx 1$). This library of hydrogels is, to date, the largest combinatorial library of a diverse set of stable polyacrylamide-chemistries. Five formulations turned opaque upon preparation and were thus omitted from platelet counting.

Protein Adsorption and Platelet Resistant Hydrogels

Figure 2A:
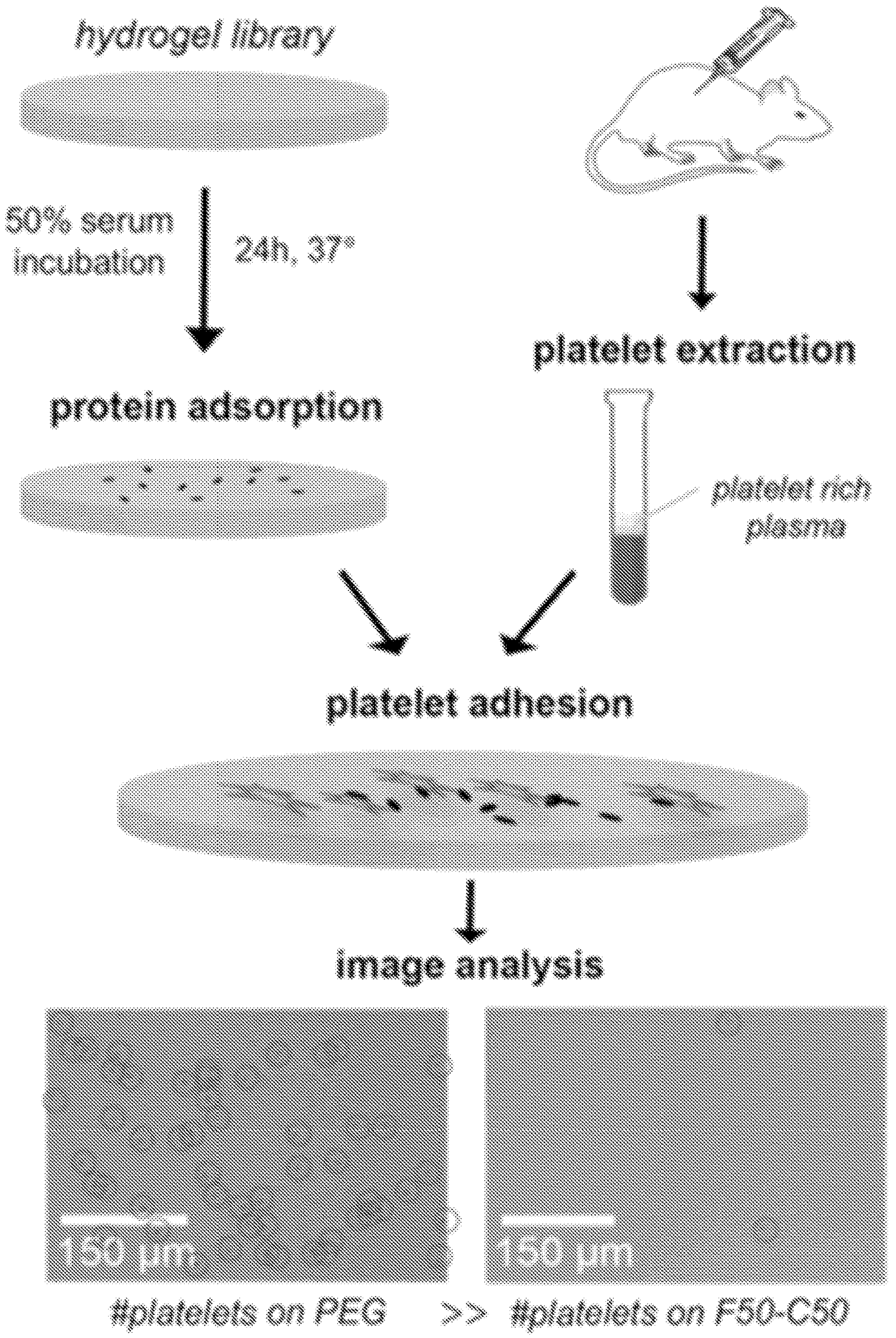
FIGS. 2A-C show according to an exemplary embodiment of the invention identification of anti-biofouling acrylamides combinations through platelet screening assay.
Figure 2B:
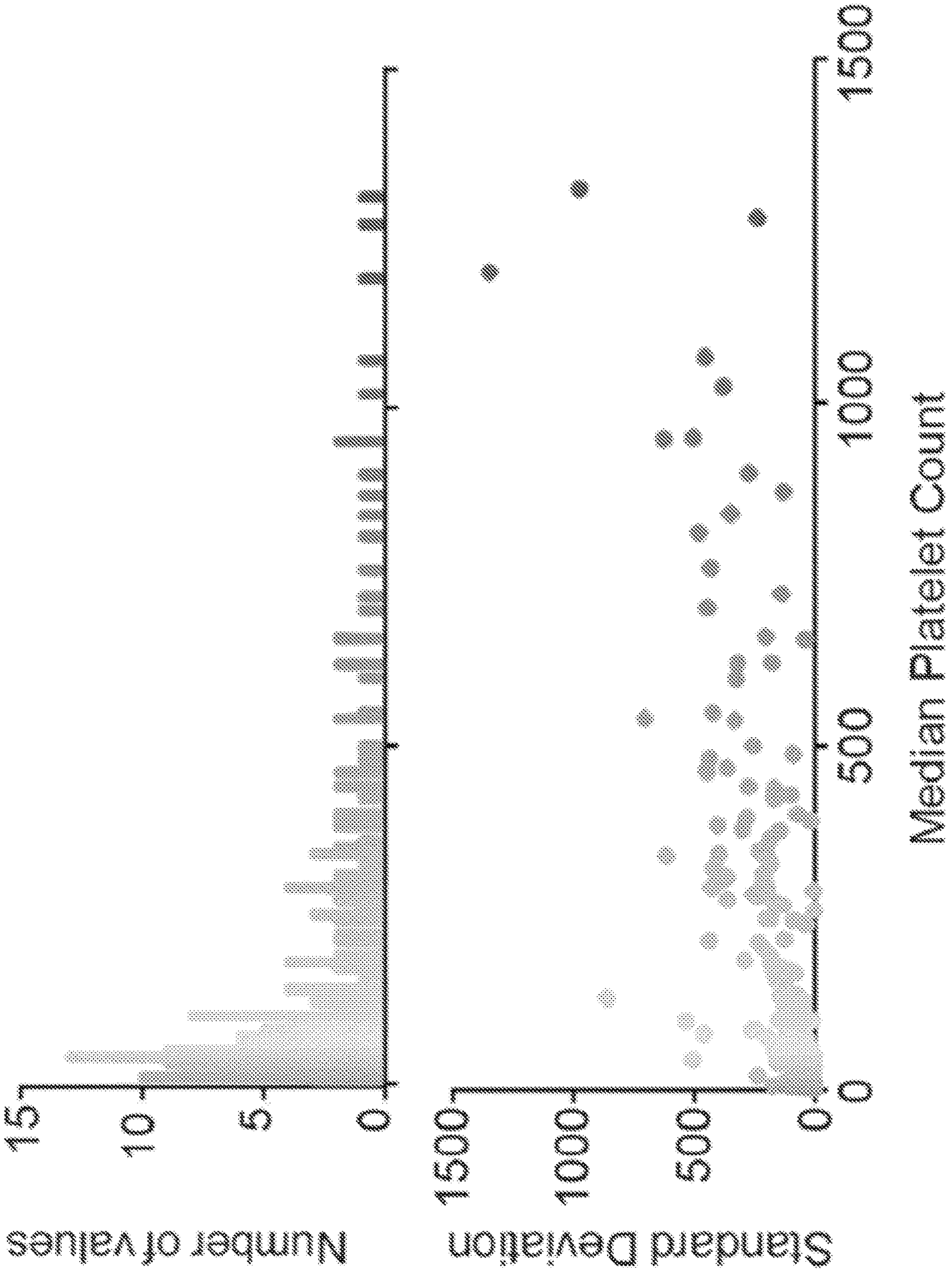
Figure 2C:
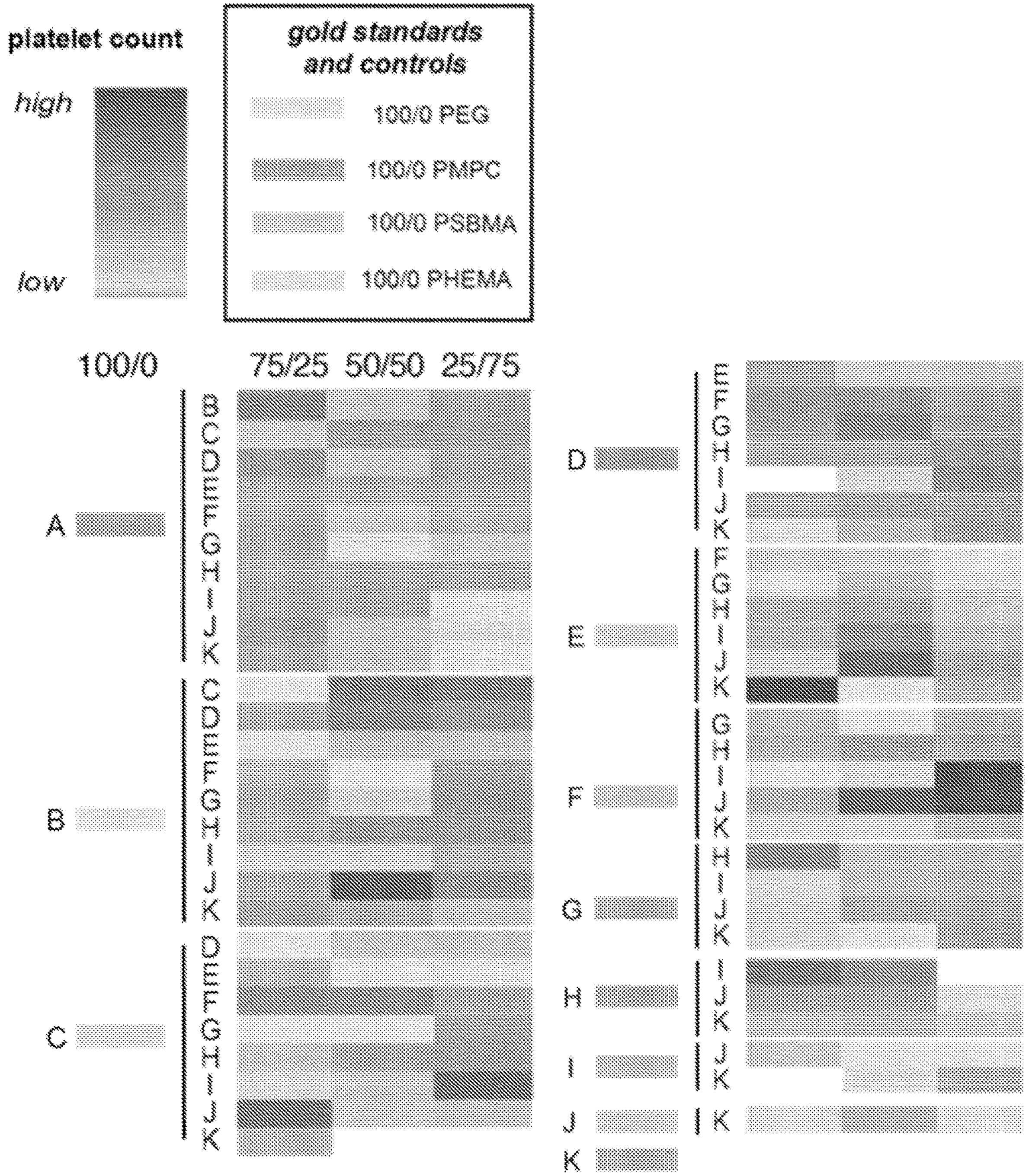

To assess the library of hydrogels, the hydrogels were incubated in 50% serum to introduce the materials to non-specific protein adsorption for 1 h at 37 degrees Celsius, shaking to encourage the adsorption of proteins that might be similarly present and flowing in the body (FIG. 2A). This allowed for distinction between the top formulations while minimizing deviation, as with greater platelet counts, we found higher variation (FIG. 2B). Platelet adhesion was quantified to assess the library in a more realistic fashion, over standard protein adhesion assays (e.g. only bovine serum albumin), which test only one protein at a time. Next, a high-throughput method was performed of screening anti-fouling properties through platelet counting, a high throughput and direct measurement (FIG. 2C; see also figure S2 of Appendix B of the priority document to which this application claims priority). This method allows direct measurement of the platelet adhesion, which causes occlusion and is the precursor of thrombosis to devices, allowing us to identify which formulation had the lowest platelet count. A 50:50 copolymer of N—N-diethylacrylamide and N-hydroxyethyl-acrylamide (F50-C50) yielded the lowest counts, outperforming PEG ($p<0.0001$) and zwitterionic formulations ($p<0.0001$).

Hydrogel-Protected Electrochemical Biosensors Resist Fouling In Vitro

Figure 3A:
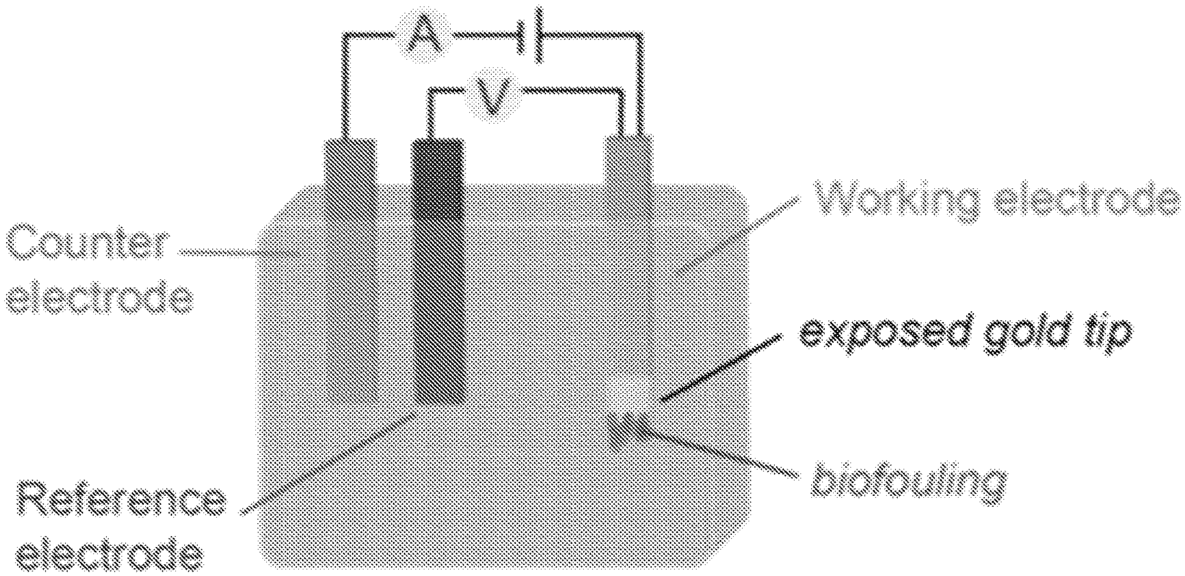
FIGS. 3A-E show according to an exemplary embodiment of the invention F50-C50 hydrogel protection of electrochemical device extends lifetime and signal quality over bare and PEG-coated devices.
Figure 3B:
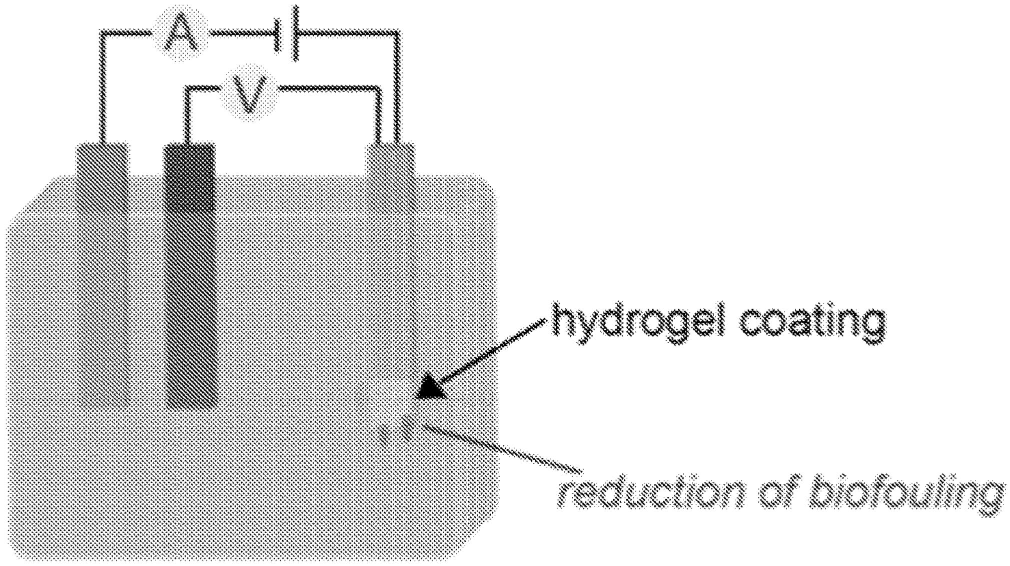
Figure 3C:
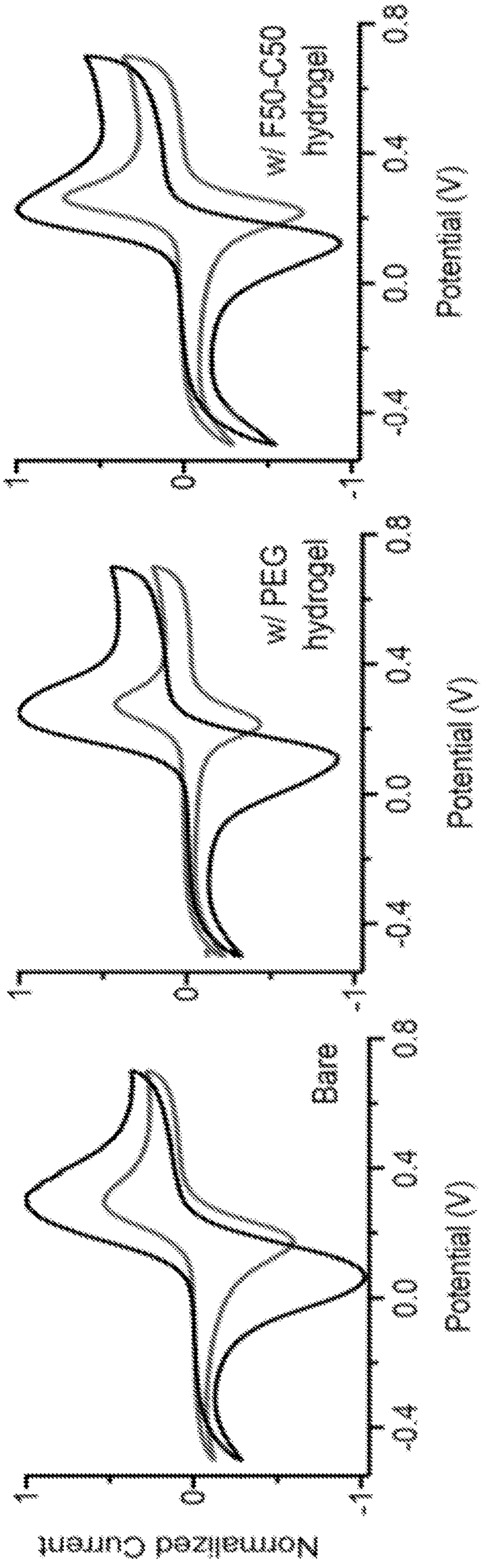
Figure 3D:
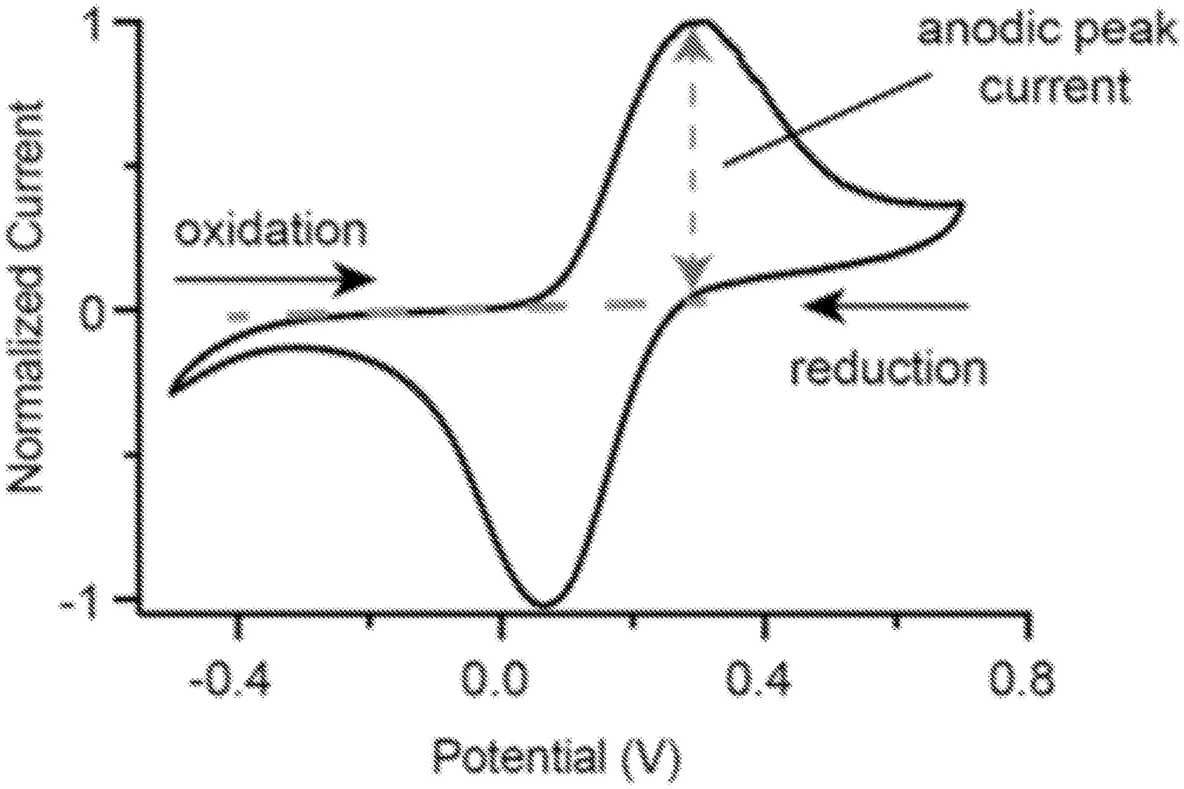
Figure 3E:
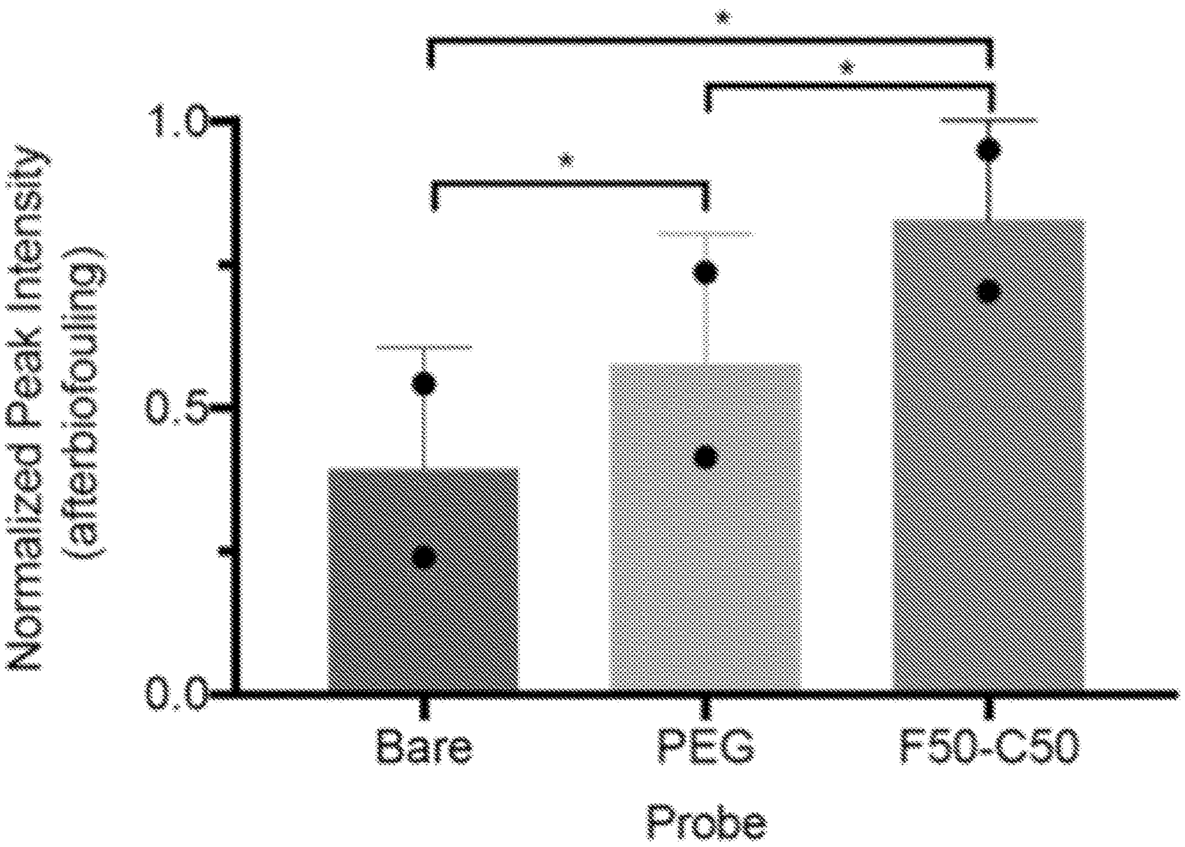
Figure 6:
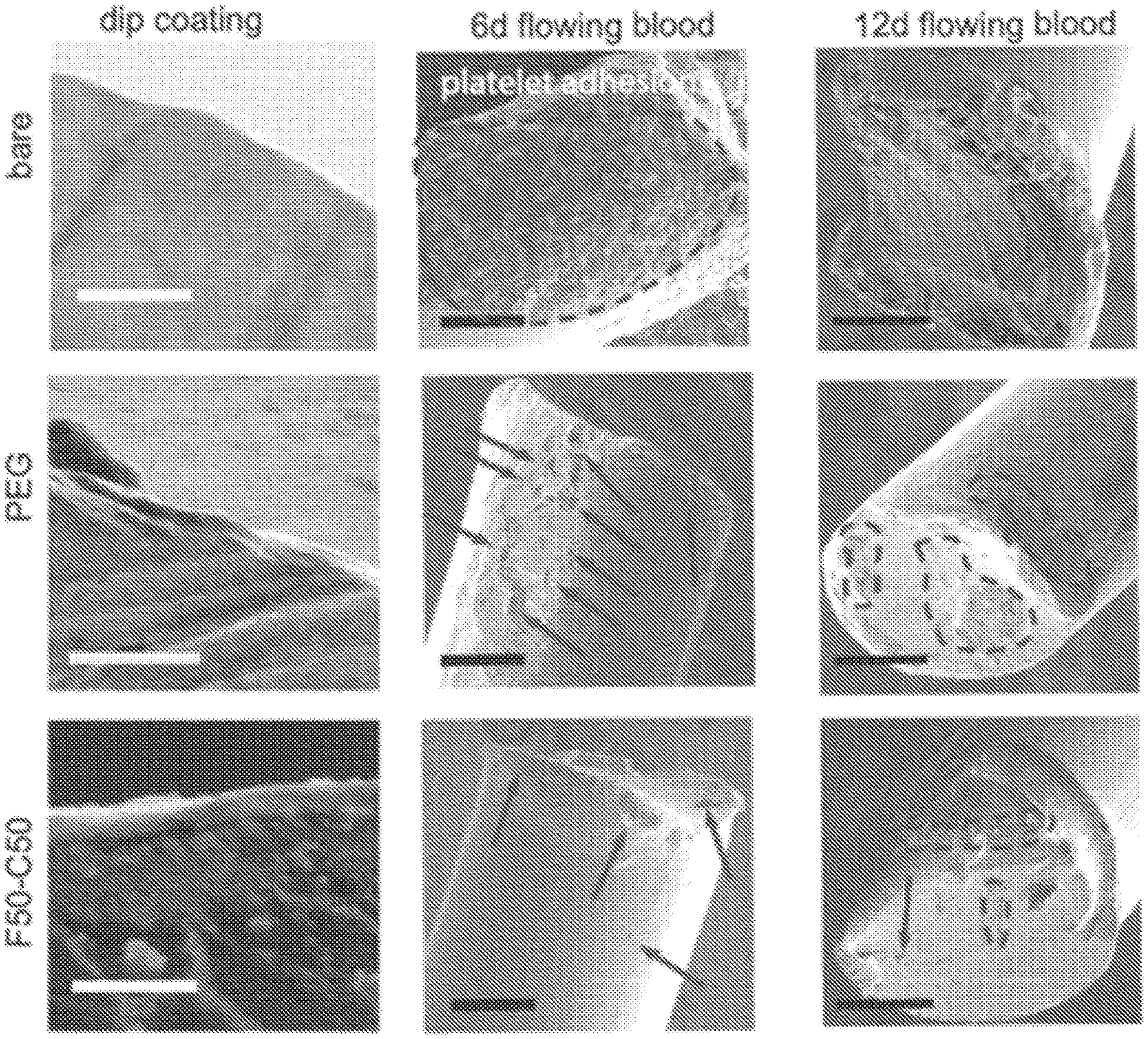
FIG. 6 show according to an exemplary embodiment of the invention EM Micrographs of the hydrogel coating on DNA aptamer probes, and the probe tips after 6 d and 12 d in flowing blood. White scale bar=2.5 μm, black scale bar=30 μm.
Figure 7A:
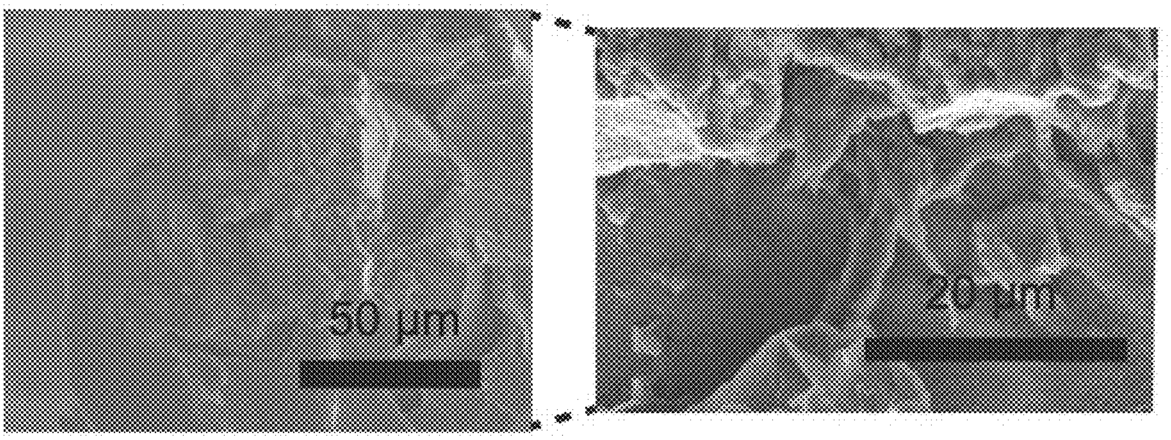
FIGS. 7A-C show according to an exemplary embodiment of the invention gold electrode probes after incubation in whole blood clotting assay.
Figure 7B:
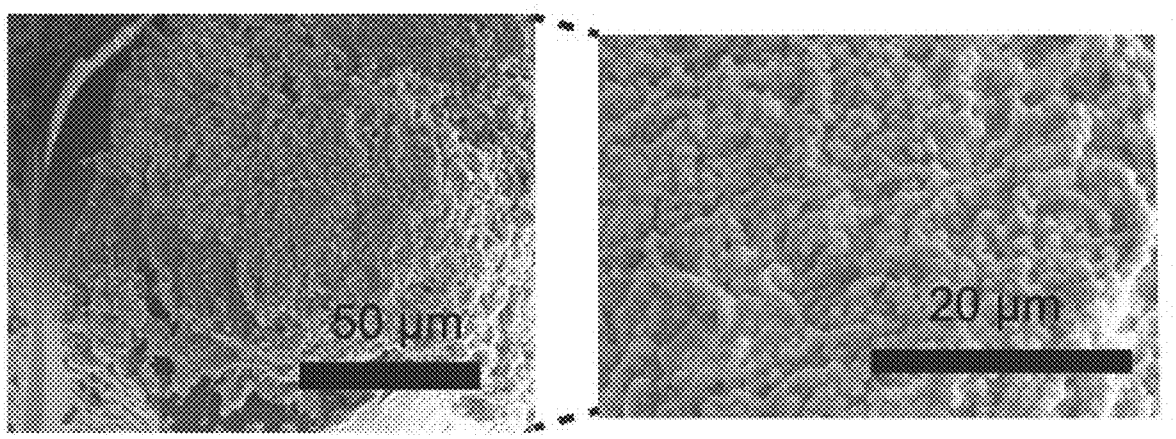
Figure 7C:
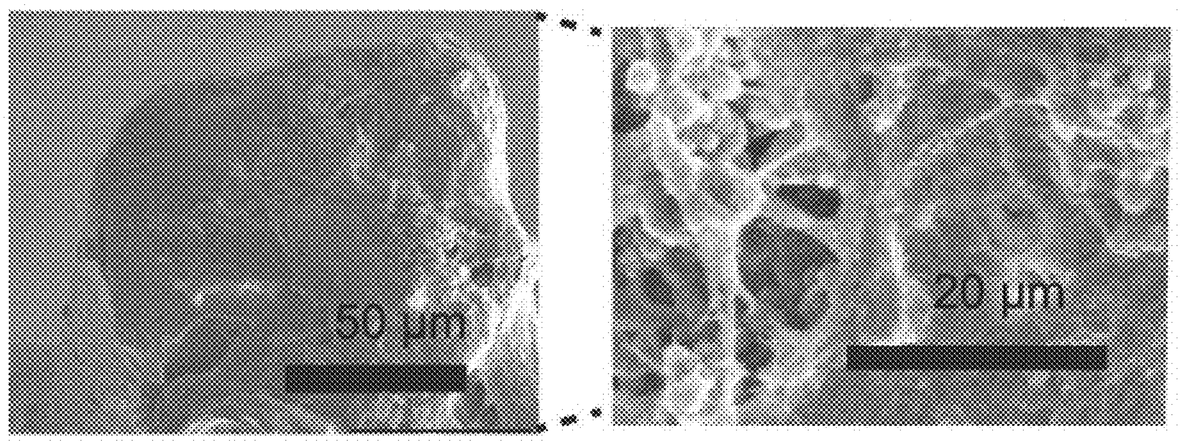
Figure 8:
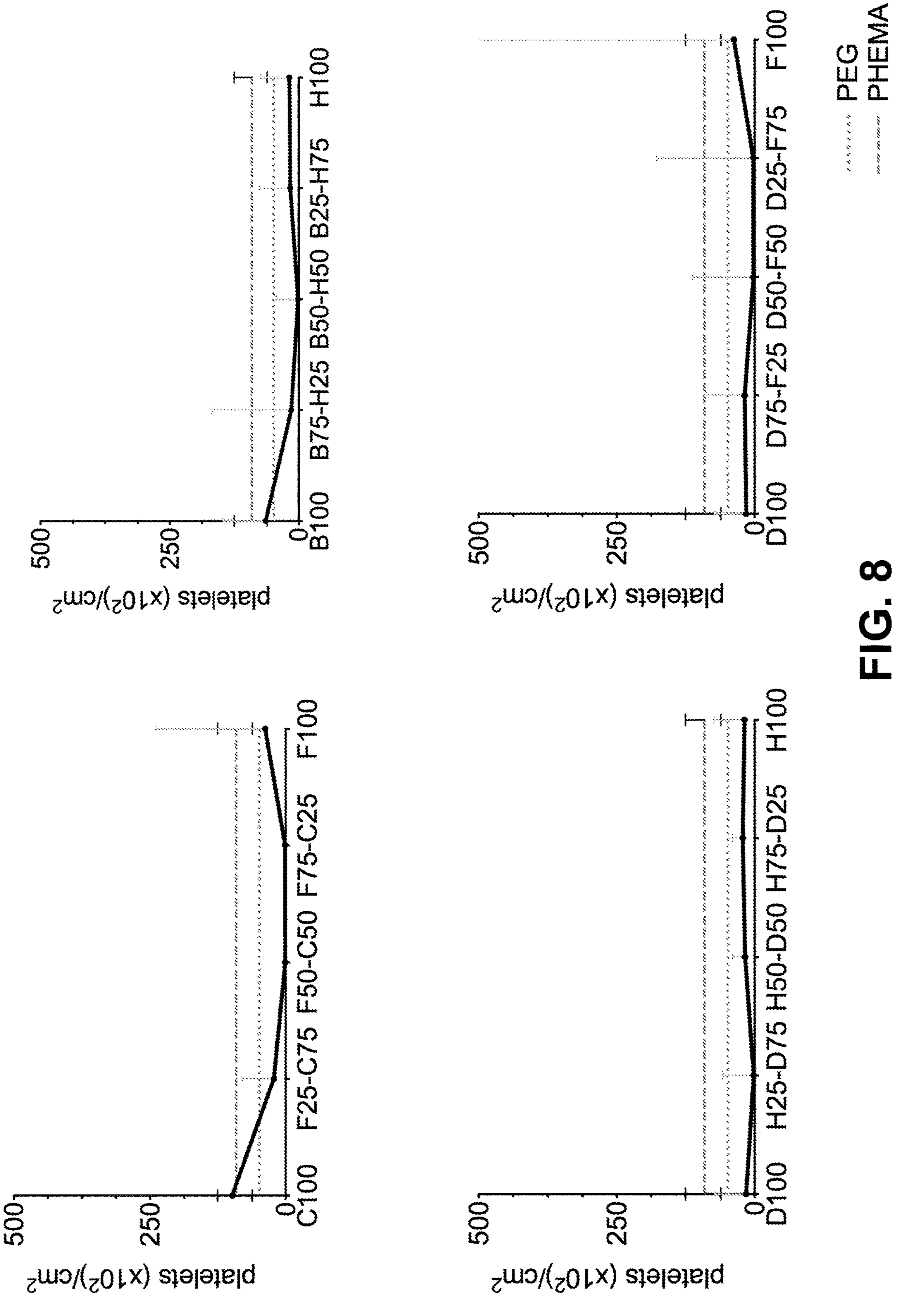
FIGS. 8-21 show according to exemplary embodiments of the invention using the so-called golden standard of PEG (dotted lines) and HEMA (dashed lines) anti-fouling polymers that have been identified as performing significantly better than the golden standard.
Figure 9:
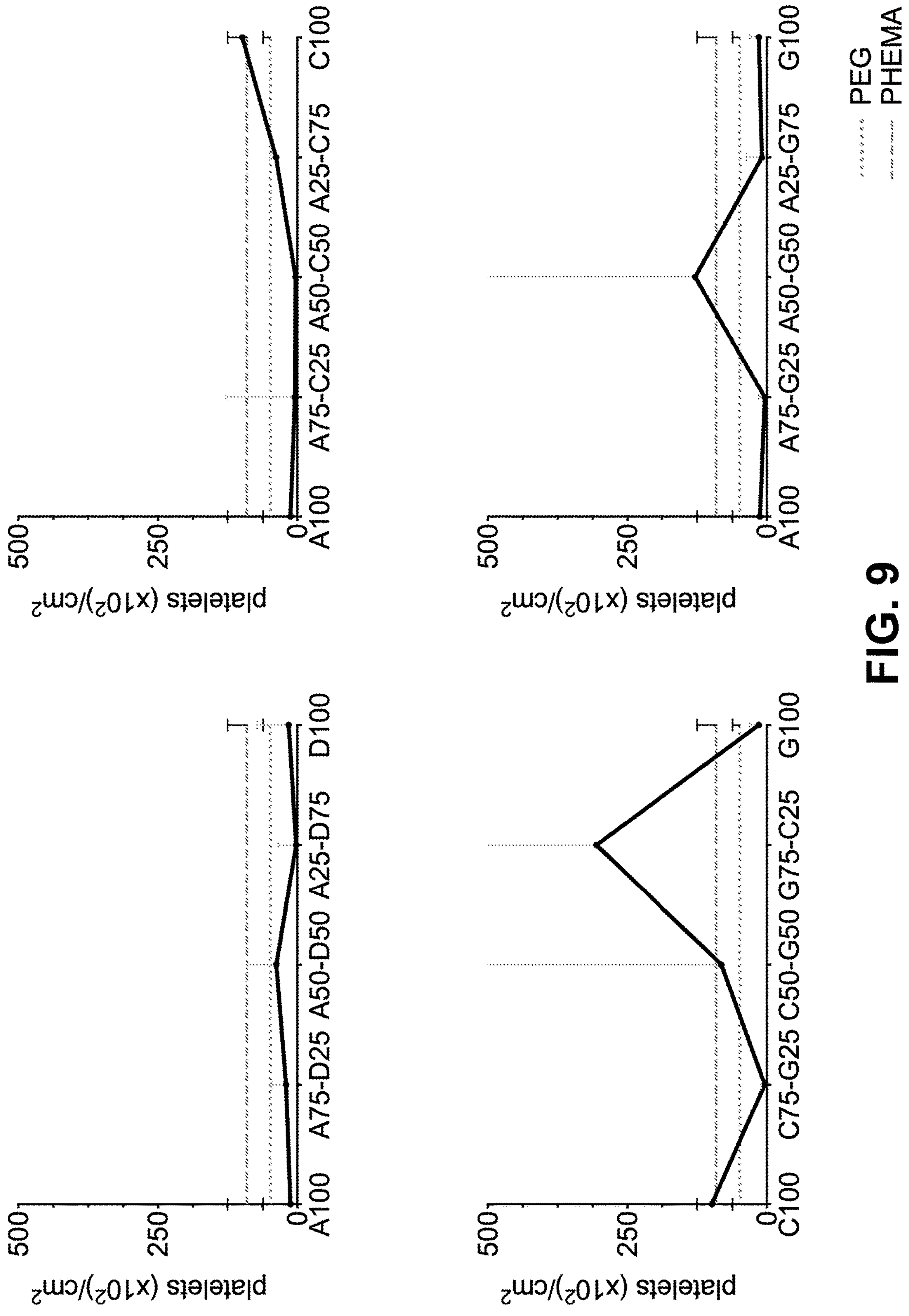
Figure 10:
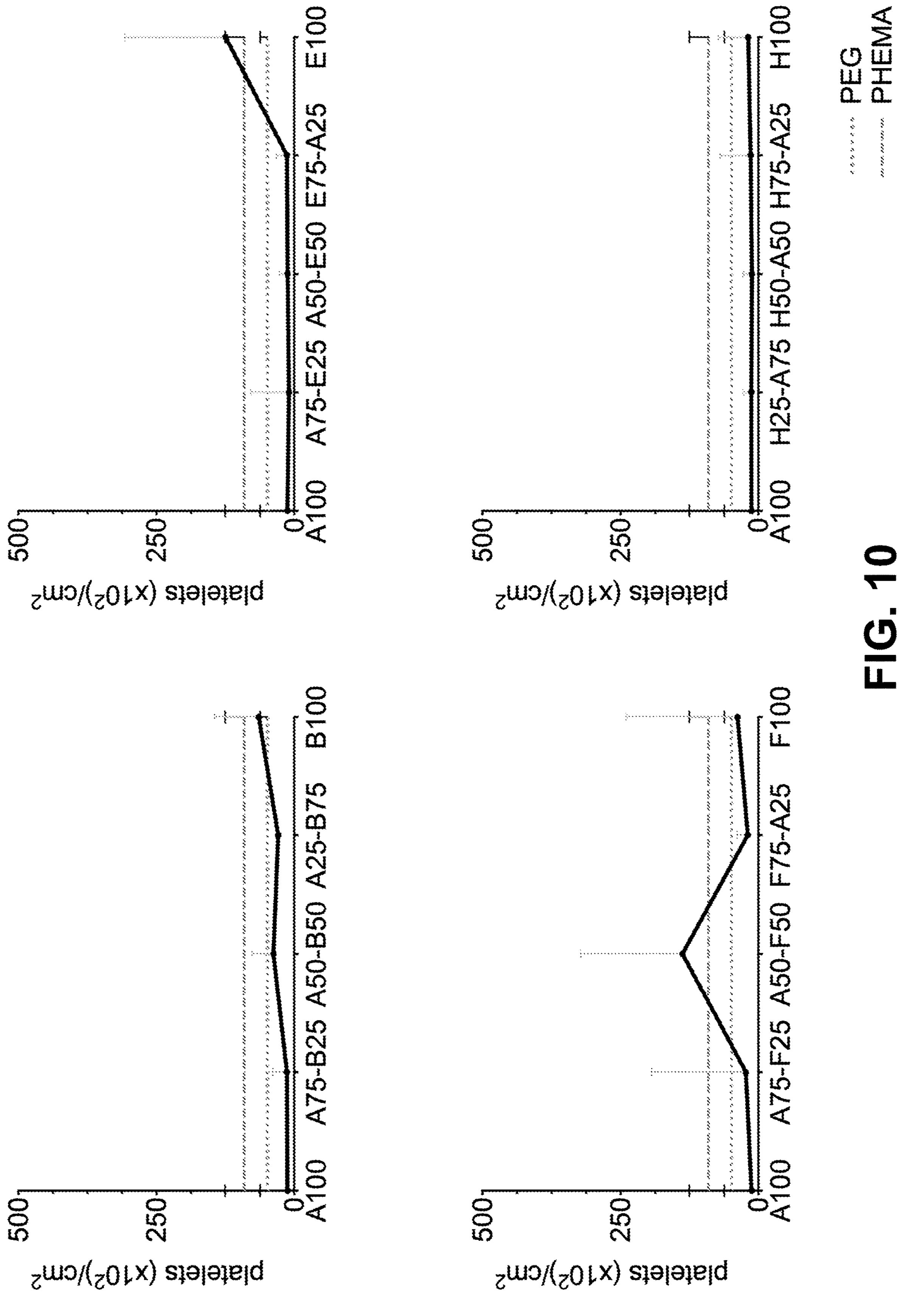
Figure 11:
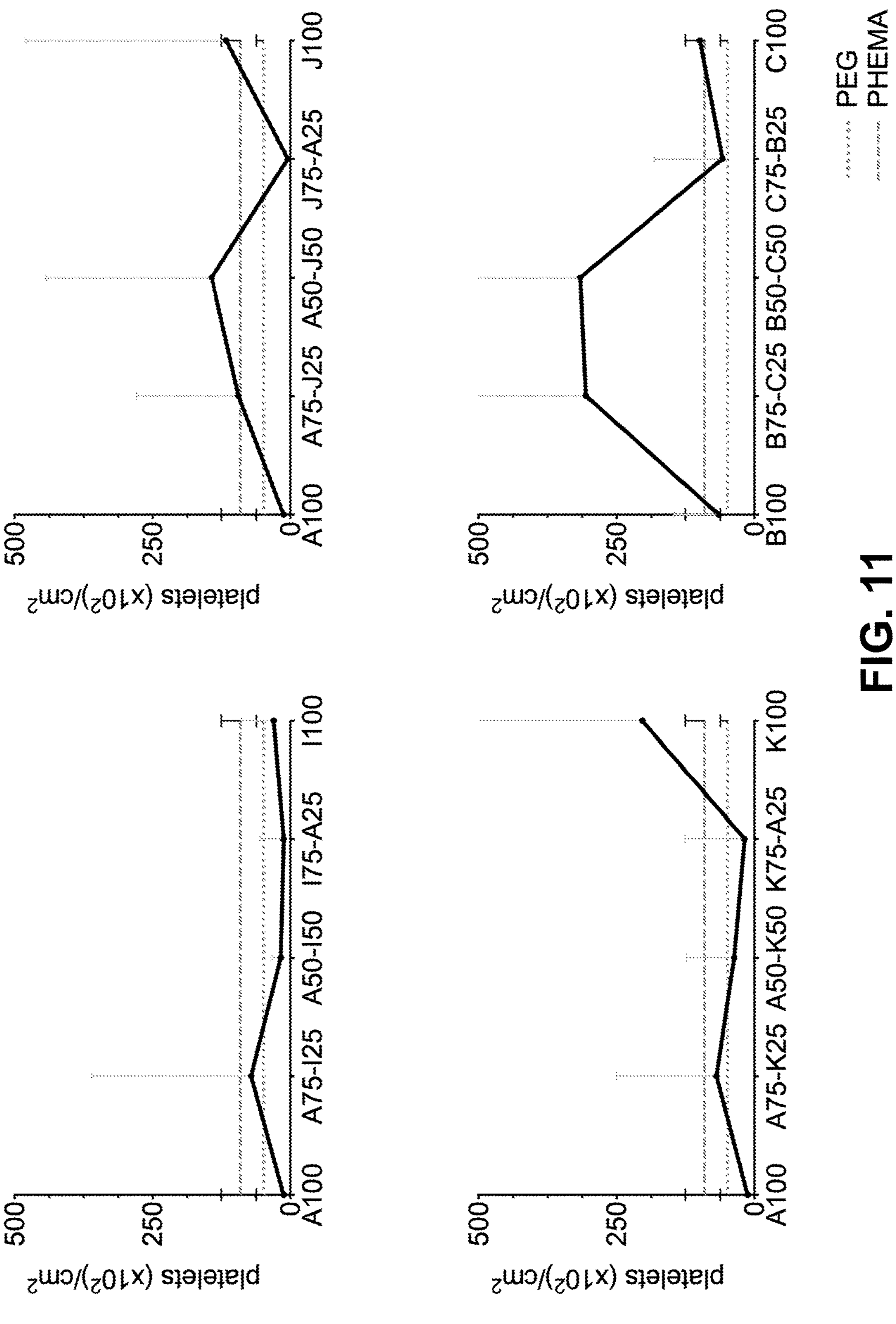
Figure 12:
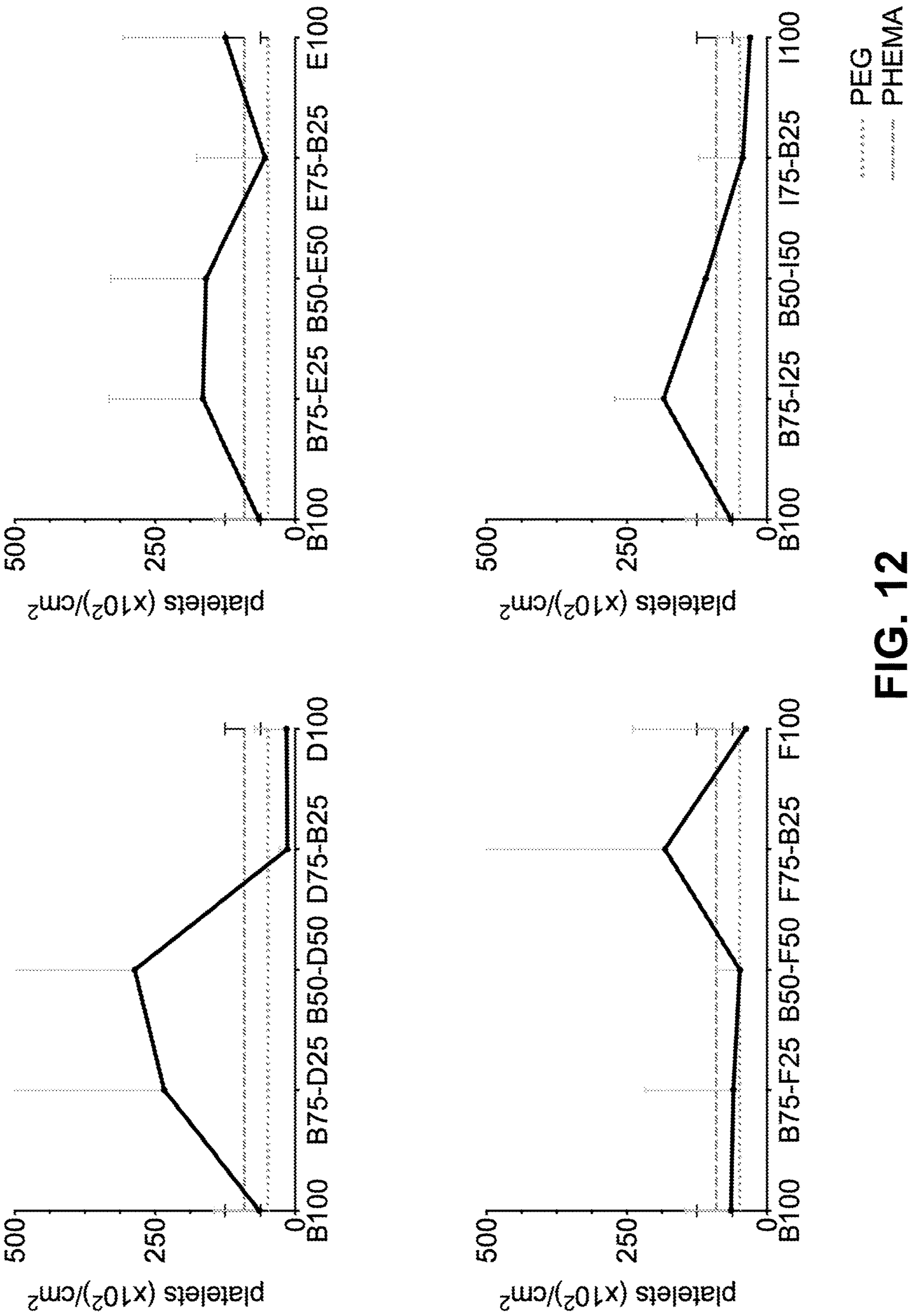
Figure 13:
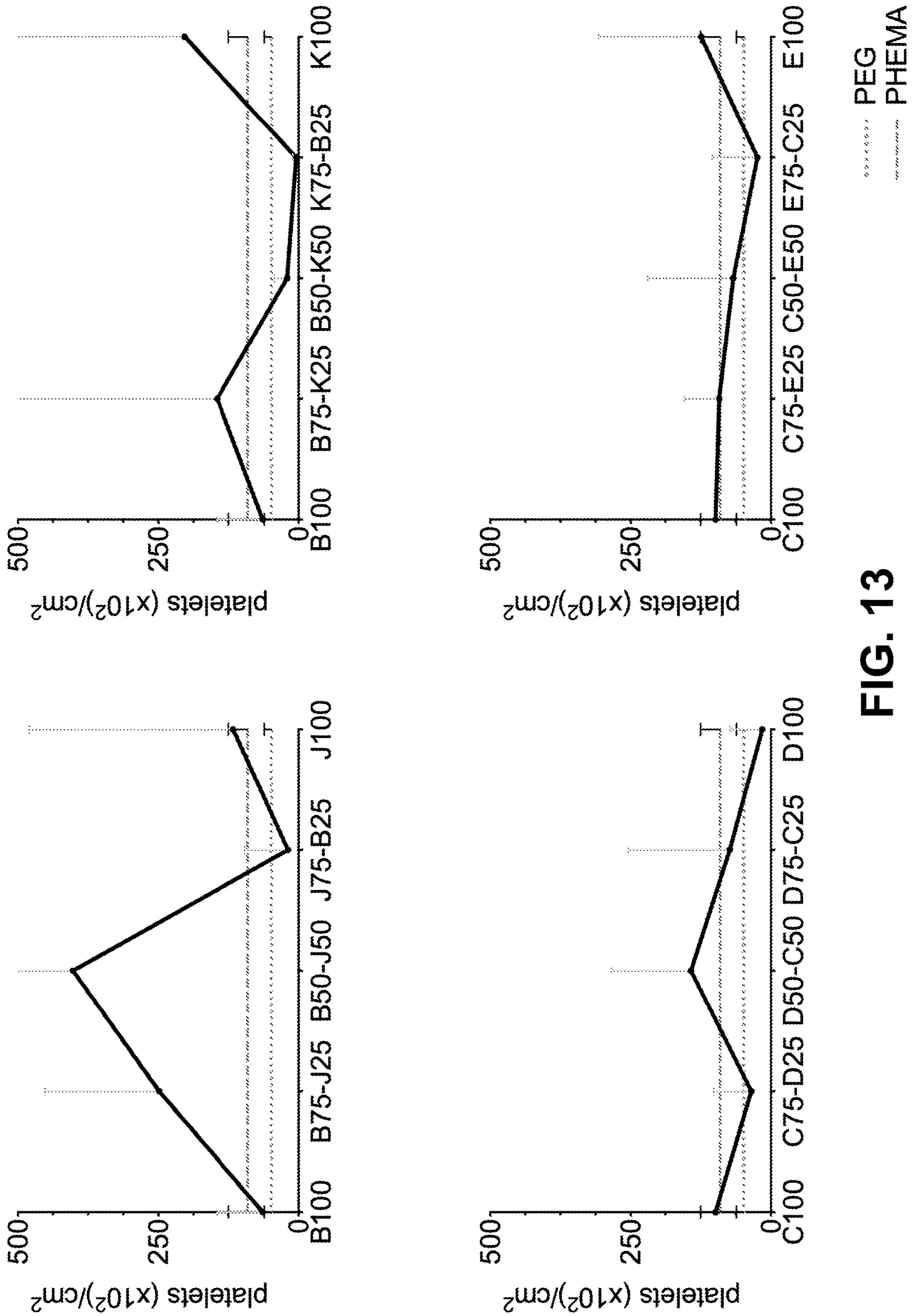
Figure 14:
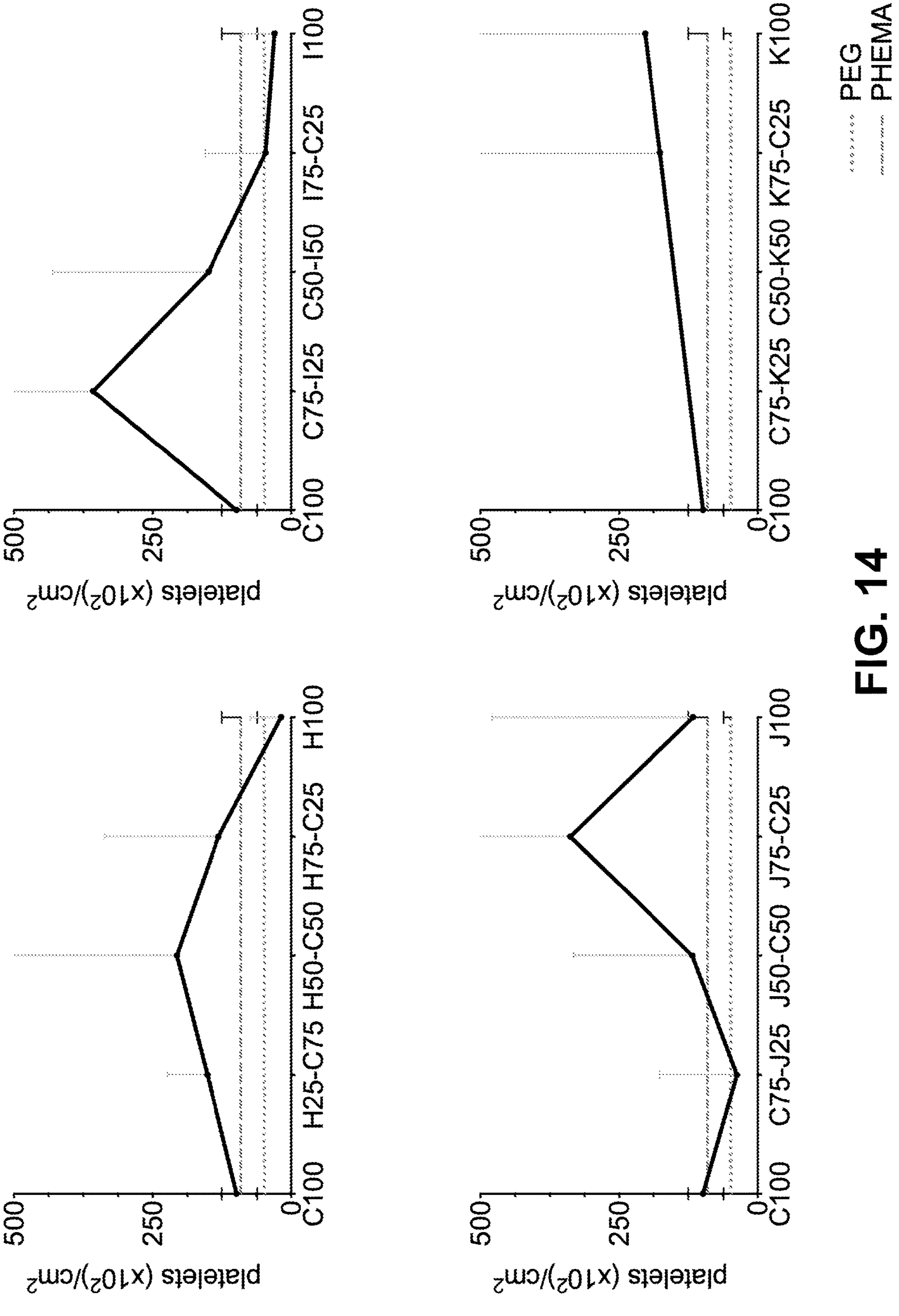
Figure 15:
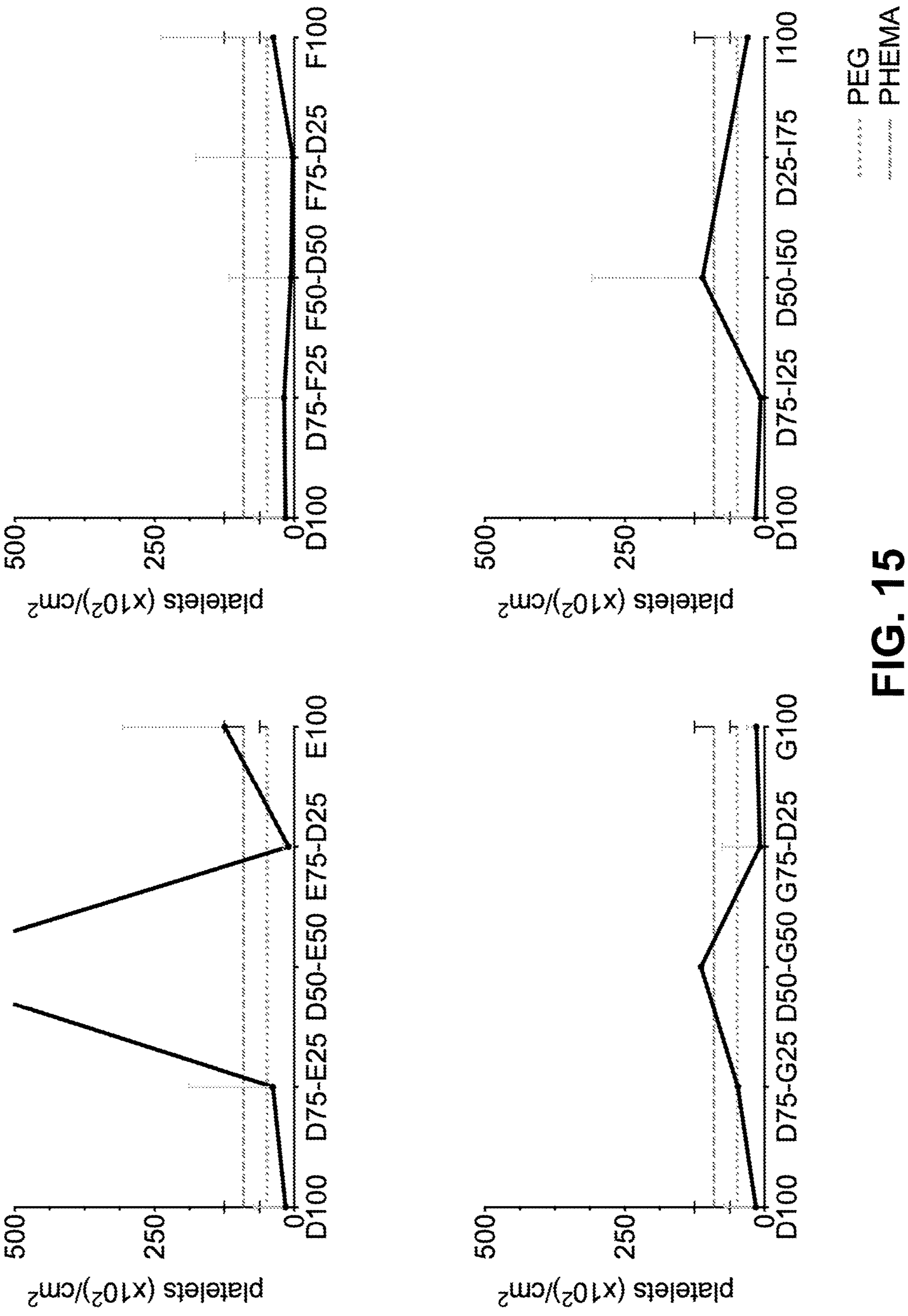
Figure 16:
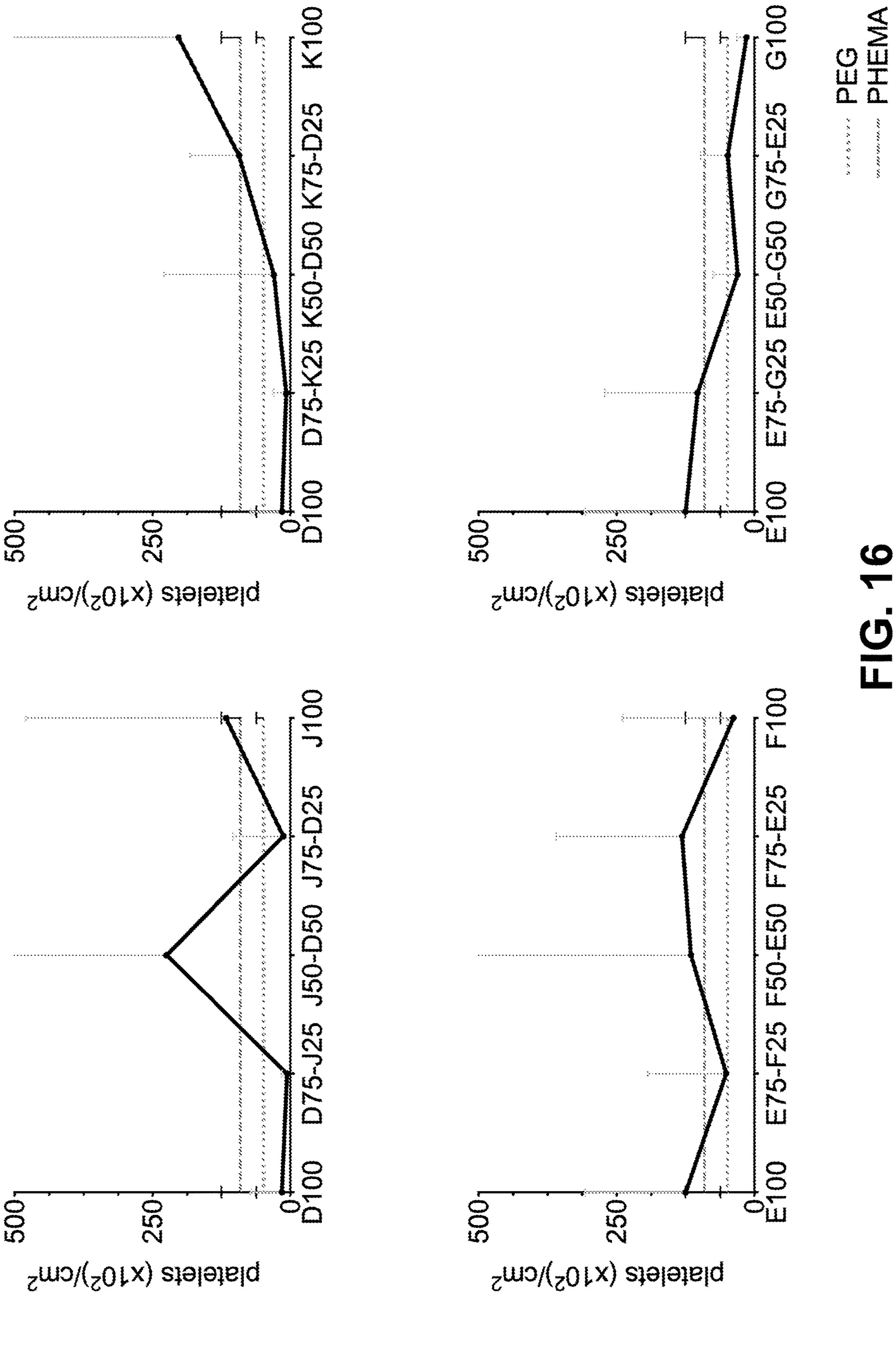
Figure 17:
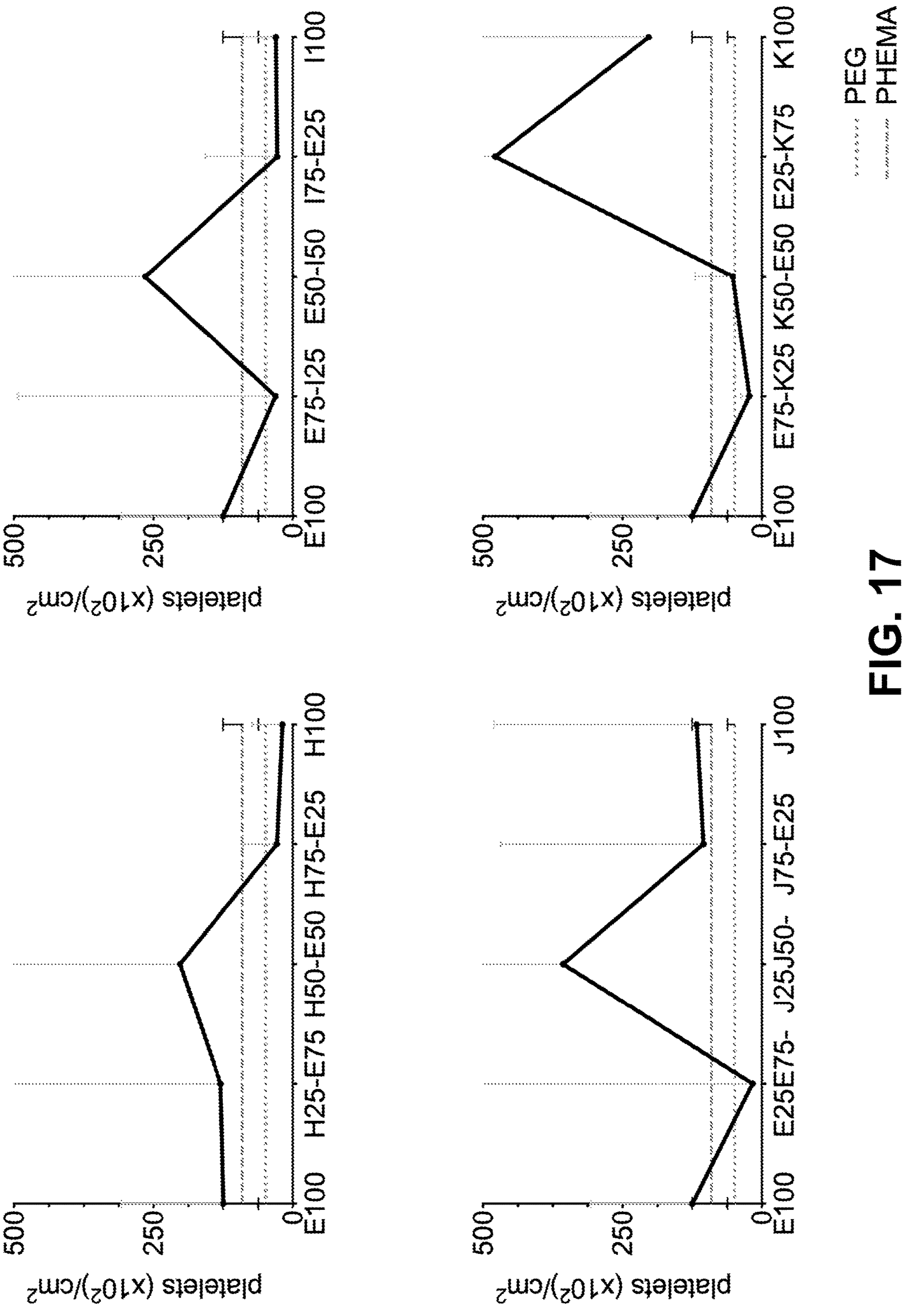
Figure 18:
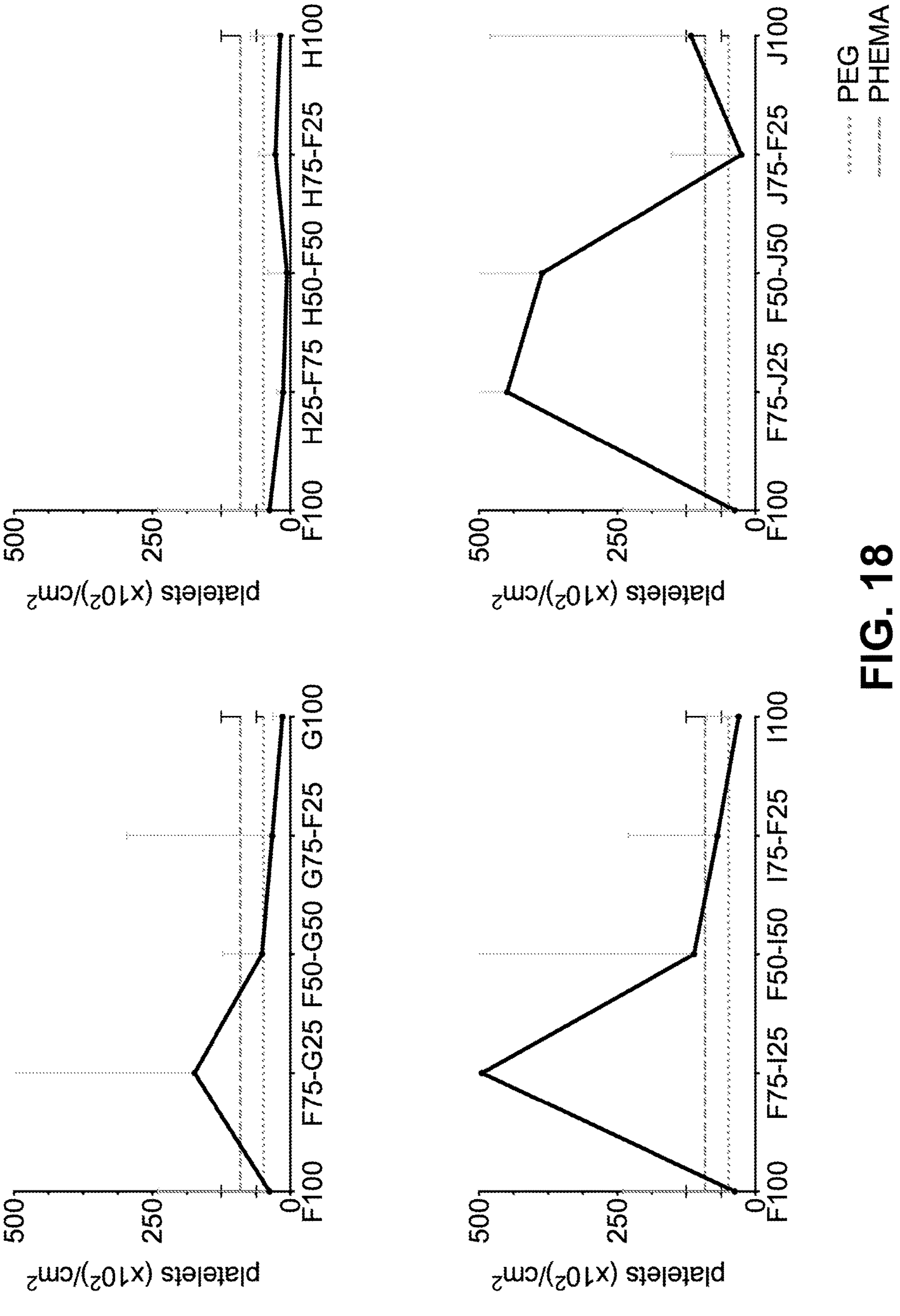
Figure 19:
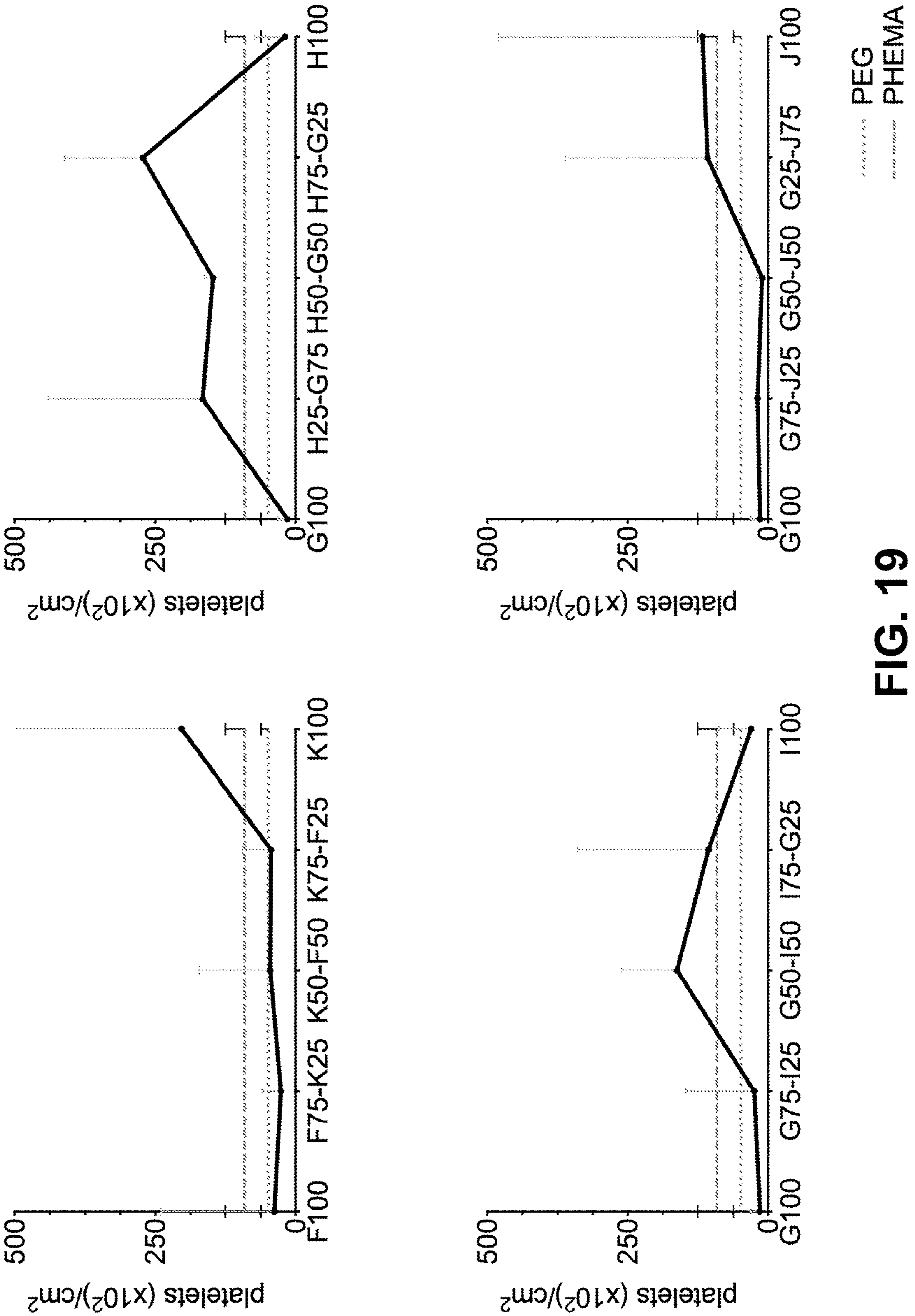
Figure 20:
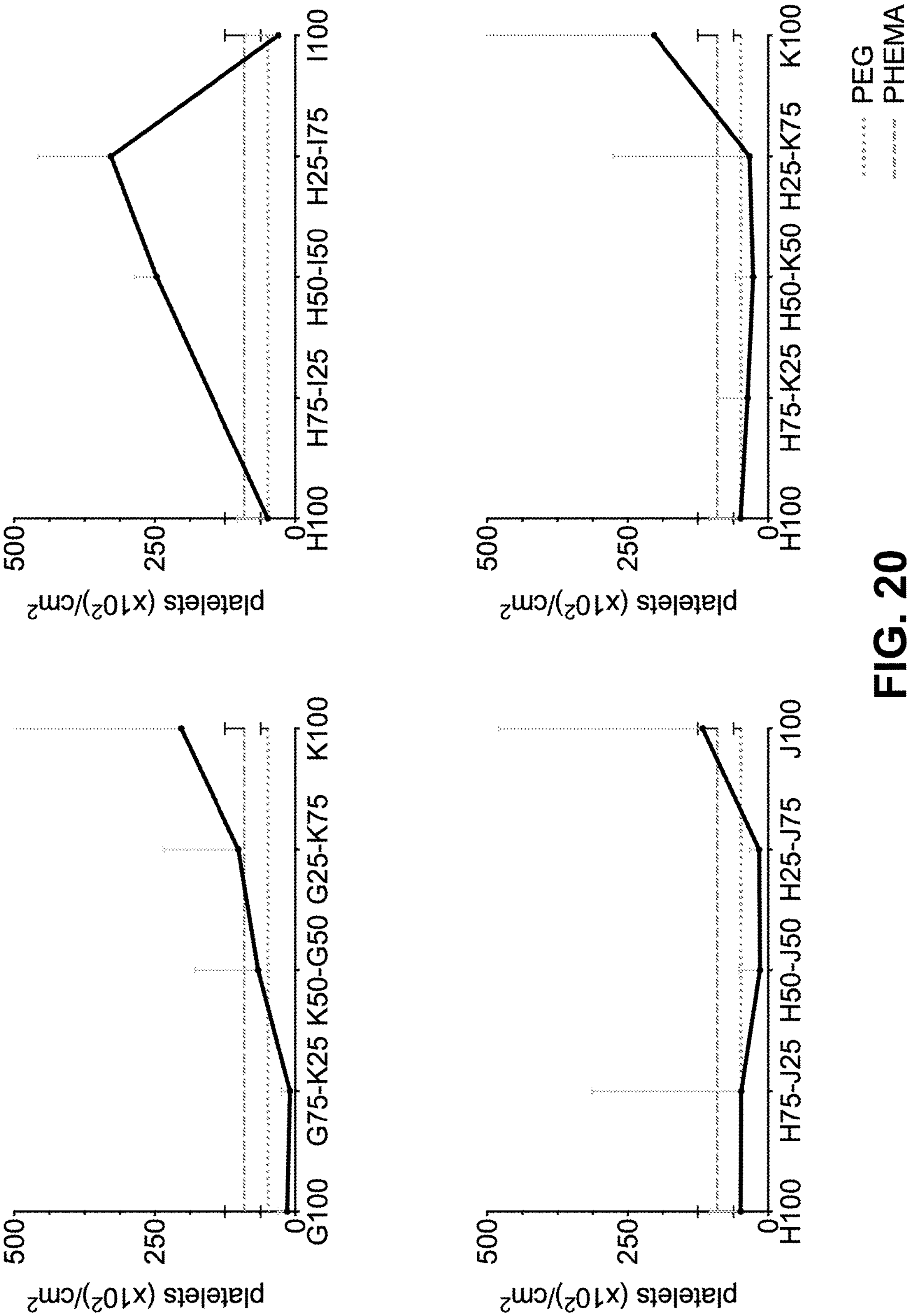
Figure 21:
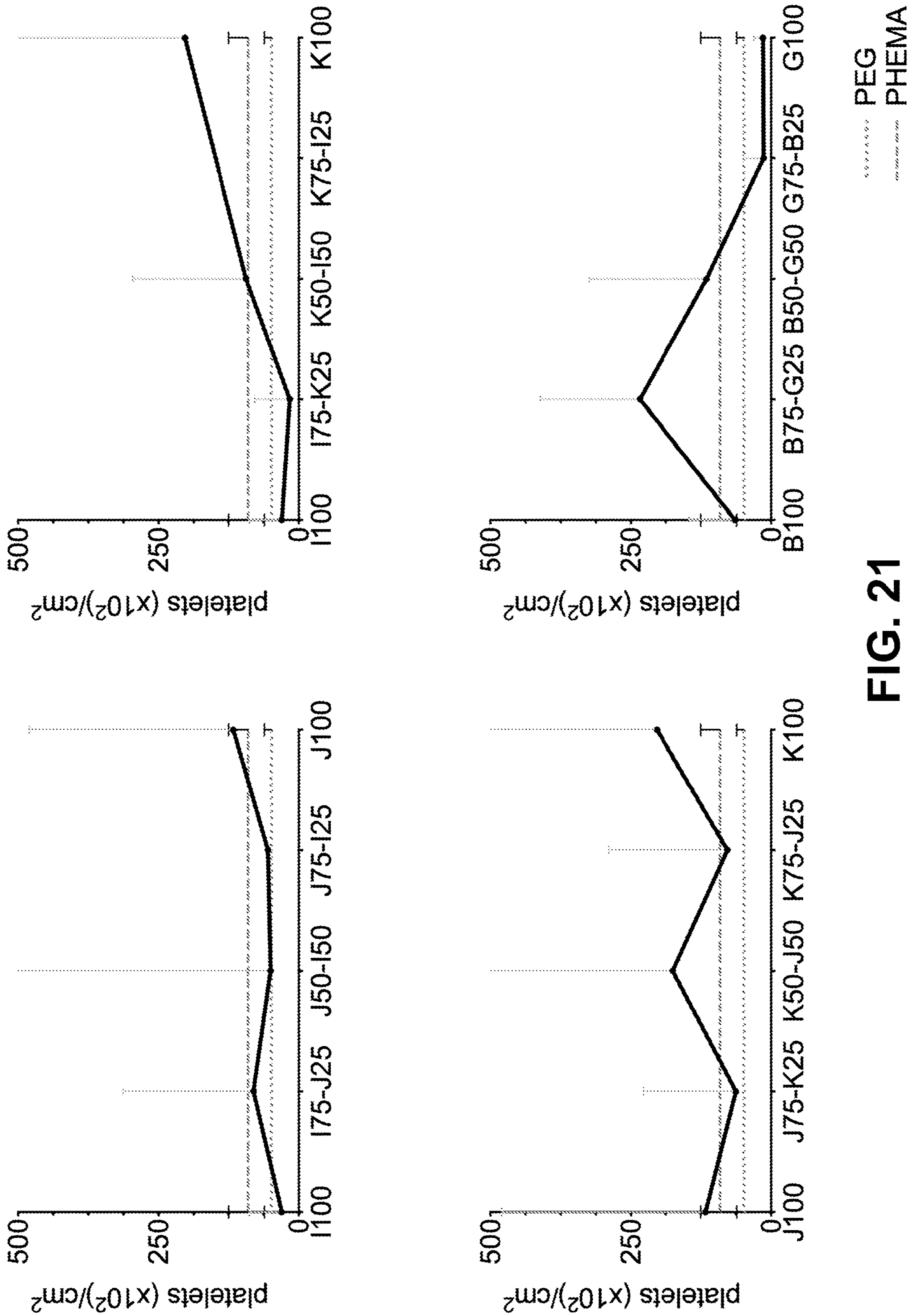

To test the ability of the hydrogel coating to extend the lifetime and fouling of a medical sensor, affinity-based electrochemical probes were used having a gold (Au) wire (working electrode), silver/silver chloride (Ag/AgCl) wire (counter electrode), and a platinum (Pt) wire (reference electrode) coated with and without hydrogel (FIGS. 3A-B). The probes were incubated in human whole blood, a complex biological fluid, that had $Na_2EDTA$ to prevent immediate coagulation. Electrochemically active solution of $FeCN_6$ was added. To directly activate the platelets, $CaCl_2$) was subsequently mixed into the biological fluid to provide an excess of $Ca^{2+}$ ions that initiated expedited blood coagulation. Anodic peak current relative to starting peak current were used to assess signal interaction between the electrode surface and $FeCN_6$ and the lifetime and quality of the signal (FIGS. 3D-E). F50-C50 hydrogel coating exhibited significantly improved current intensity over PEG and bare coated electrodes (FIG. 3E; FIG. 6).

Coating of DNA Aptamers with Hydrogel

Figure 4A:
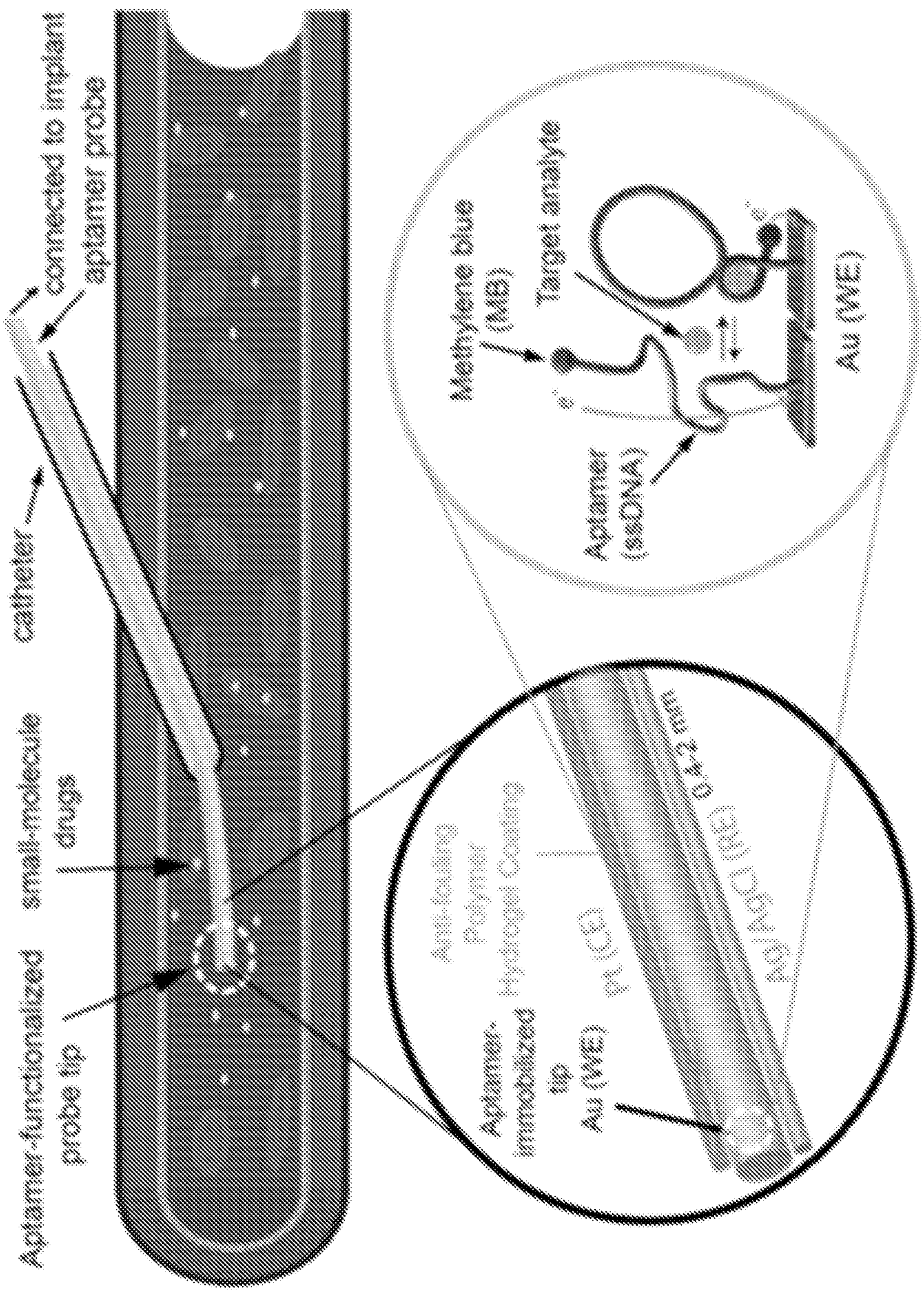
FIGS. 4A-C show according to an exemplary embodiment of the invention F50-C50 hydrogel protection of the DNA aptamer biosensor enable in vivo monitoring of small-molecule drugs.

DNA aptamers, single strands of DNA, can be used in the live real-time monitoring of specific analytes (i.e. kanamycin) and can be functionalized on the surface of gold wires (FIG. 4A). As a proof of concept for the application of this coating to medical devices, aptamer-based biosensors were used that offer the capability to continuously monitor specific biomarkers. To improve their performance in vitro, the anti-biofouling coating F50-C50 was applied to protect the aptamer-based sensor against biofouling. The mesh size (ε), quantified through Fluorescence Recovery After Photobleaching (FRAP), of this hydrogel coating (ε=2.33±0.07 nm) allowed free transport of solute of interest kanamycin (484.5 Da; diameter ~1 nm). The aptamer probe was dip-coated with pre-crosslinked hydrogel formulation F50-C50 and immediately cross-linked for 30 seconds at hv=350 nm. PEG and F50-C50 gels formed a homogenous coating. As an initial check of biofouling, the probes were connected into a closed-look system of flowing blood and imaged after 6 days and 12 days. PEG-hydrogel coated DNA aptamers exhibited significantly less platelet adhesion after 6 days, but aggregation was present after 12 days. DNA Aptamer probes coated with F50-C50 hydrogel presented noticeably less platelet adhesion after both timepoints (FIG. 6).

Hydrogel Enables DNA Aptamer Devices In Vivo

Figure 4B:
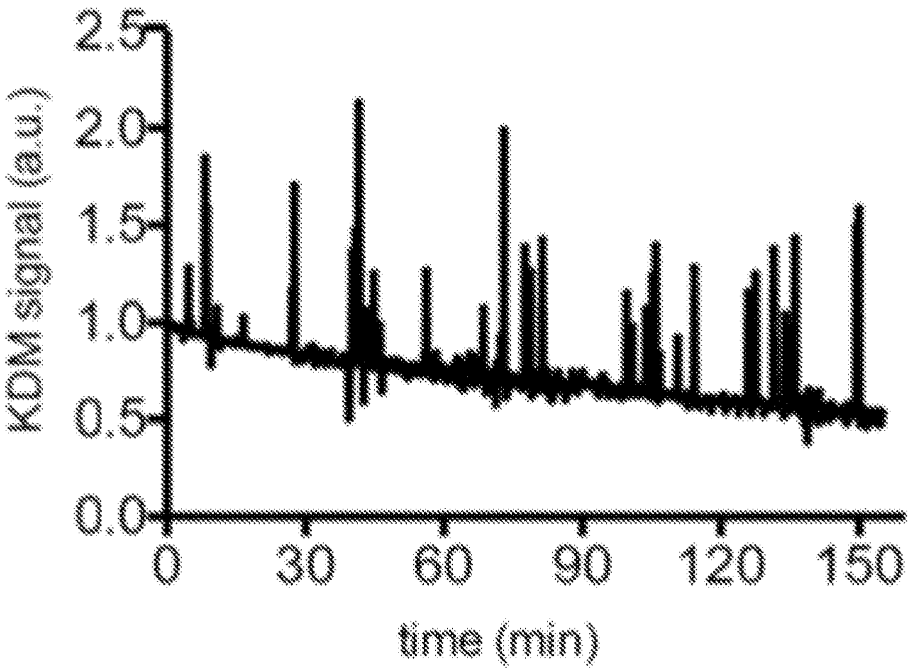
Figure 4C:
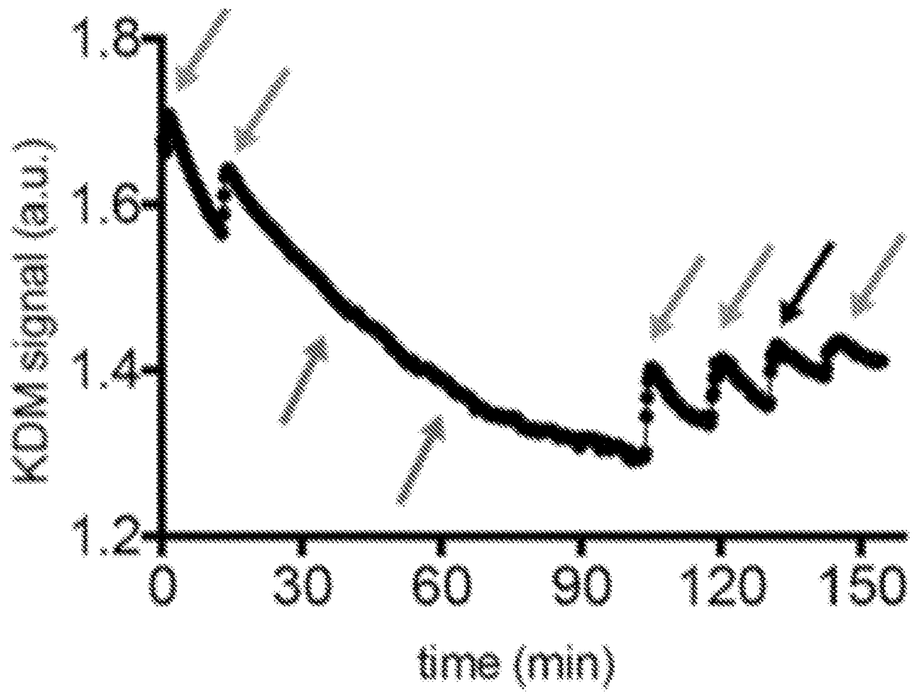

To test translation to the in vivo space, the sensing probe was inserted into a rat vein through a catheter into the blood vessel to enable monitoring of drugs and small molecules (FIG. 4A). The sensing probe was connected to the tubing and square-wave voltammetry (SWV) will be performed continuously to measure the electrochemical sensing of small molecules of interest. While these devices have been successfully used in in vitro systems, their use is limited in vivo due to biofouling. With protection from polysulfone membranes, which is commercially available for protection of the aptamers, these sensors exhibit limited lifetimes on account of biofouling from blood cells and serum proteins, often producing noisy data with high background (FIG. 4B). Towards this goal, the coated aptamer probe was inserted into the femoral vein in an in vivo model, followed by bolus kanamycin injections. The hydrogel device enabled the detection of kanamycin over two hours (FIG. 4C). To show specificity if the aptamer binding in vivo to kanamycin only, we injected ampicillin at two timepoints and no signal was observed, as was expected.

Mechanical Properties of the Top Performing Hydrogel

Figure 5B:
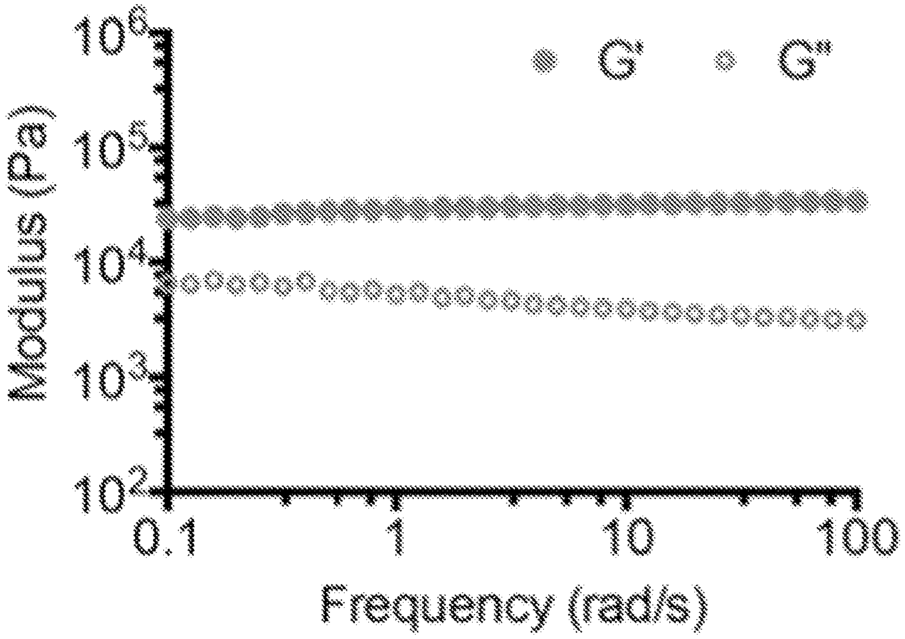
Figure 5C:
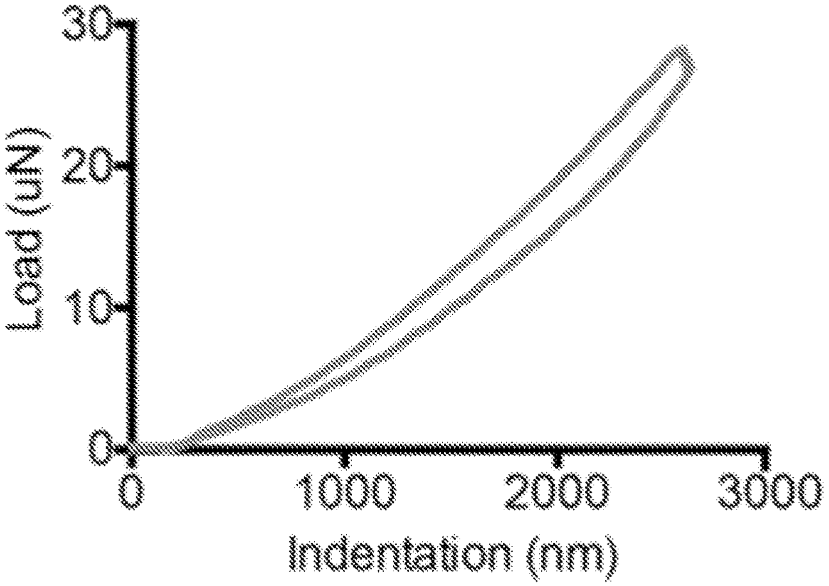
Figure 5D:
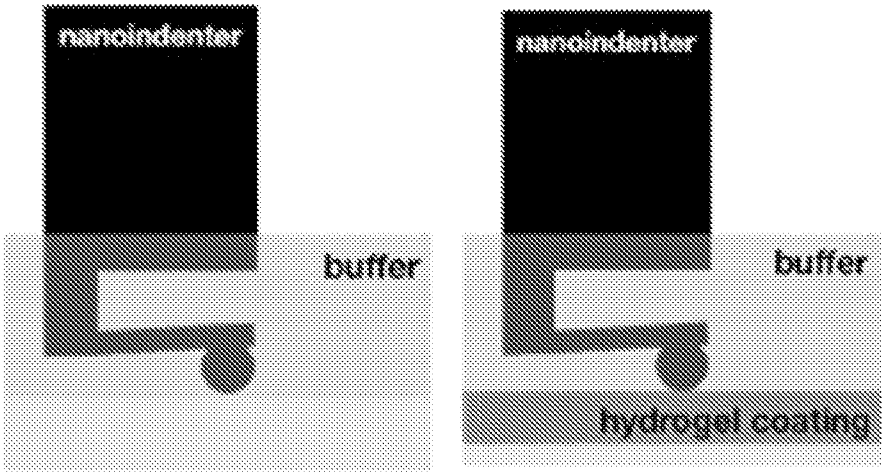
Figure 5E:
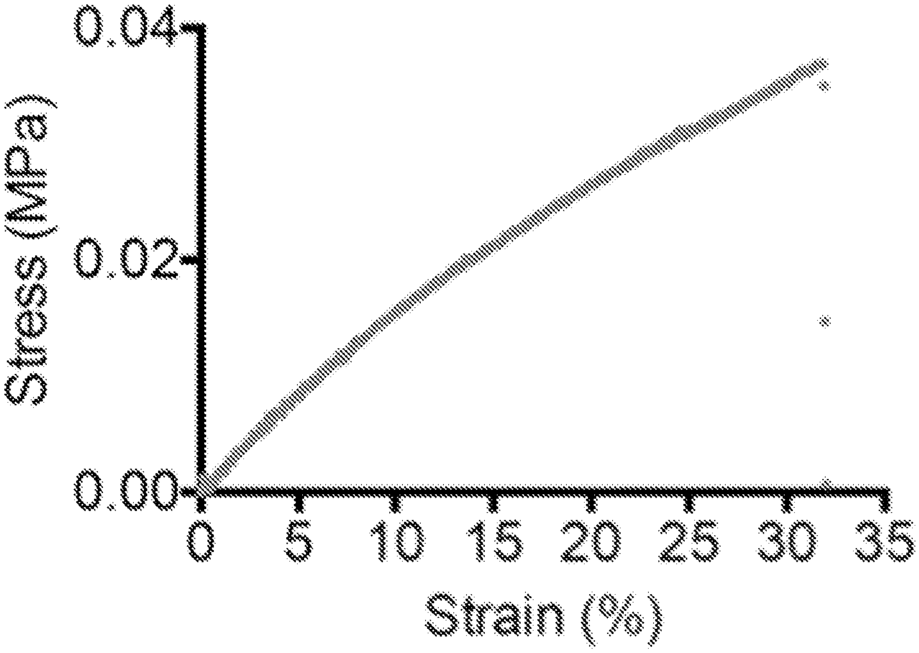
Figure 5F:

To further understand and validate properties of the top performing anti-biofouling hydrogel, mechanical properties were examined to ensure adequate translation into biological systems. These properties play a crucial role in such applications (FIG. 5A); specifically, it is crucial to match the mechanical properties of the biomaterials with surrounding tissue, and rheology was used (FIG. 5B), tensile testing (FIG. 5C) and nanoindentation tests (FIGS. 5D-F) to examine these properties. The latter most test employed interferometry-based nanoindentation, which allows one to examine the local microenvironment felt by matter in the blood under wet conditions. While soft materials commonly used in the medical industry exhibit Young's Modulus even orders of magnitude greater than that of human arteries (FIG. 5C), the hydrogel coating is within the regime of the elastic modulus of human arteries.

In one aspect, formulations as provided herein are synthesized into a hydrogel network with the aforementioned monomer ratios, but may be synthesized with these ratios in different forms, such as polymer brushes or thin films.

Methods

All materials were purchased from Sigma-Aldrich and used as received, unless later specified.

Hydrogel preparation: Pre-polymer formulations containing 20 wt % acrylamide monomer, 1 wt % lithium phenyl-2,4,6-trimethylbenzoylphosphinate (LAP) as photo-initiator, and 1 wt % methoxy-bis-acrylamide were mixed in water and pipetted between two glass slides separated by a silicone spacer (0.25 mm+0.05 mm). Gels were cross-linked in a Luzchem photoreactor system with 8 W bulbs and an intensity of 25-40 W/m$^2$ (LZC-4, hv=350 nm, 15 min). Due to swelling of polyacrylamides in water, they were placed in 1×PBS for at least 24 h before being punched with a 6 mm biopsy punch.

Hydrogel Synthesis Modifications: All AMPSAm formulations were made with slightly basic PBS (400 μL were 1 M NaOH). tHMAm formulations were made with 50:50 DMF:water as well as 100% NiPAm, 75 DEAm, 25 NiPAm and 25 HMAm, 75 NiPAm. MAPAm formulations were used with 2×-3×MBAm concentration. PMPC zwitterionic gel was formulated with 2×MBAm and PSBMA was formulation had added MPAm (75/25). HEMA gels were soaked in 50:50 PBS:DMF for 1 hr, 70:30 PBS:DMF for 1 days; 100PBS for 1 day (60 mg HEMA, 70 mg PEGdma). PEG gels were 15 wt % PegDA as crosslinker, 5 wt % PEGma.

Platelet adhesion test: Fresh rat whole blood was mixed in a 10:1 volume ratio of an acid citrate dextrose (ACD) anticoagulant buffer (containing 2.13% free citrate ion, BD Vacutainer Specialty Venous Blood Collection Tubes) for the preparation of platelet-rich plasma (PRP). PRP was obtained via centrifugation at 600 g for 10 min at 10° C. The platelets were counted using Countess (Company, CA, USA) and diluted to 2.5×10$^6$ platelets/mL in 1×PBS. 6 mm punches of hydrogels were places in ultra-low adhesion 96 well plates and incubated for 24 h at 37° C. Gels were UV sterilized for 5 min prior to incubation with platelets. 100 μL of PRP was pipetted on top of the hydrogels. Plates were placed on a rotary shaker for 1 h at room temperature. Platelets were rinsed once with 1×PBS and fixed with 4% PFA. Cells were imaged with EVOS XL Core Imaging System (Life Technologies) microscope.

Platelet Detection in Images: Platelets in the images are small round objects, i.e., blobs, approximately 3-4 μm in diameter. Platelet images are of different color and can include various noise, such as gel chunks or dust. The noise typically takes shape of blobs of size considerably smaller or larger than platelets. The platelets in the images were detected using difference-of-gaussian approach to the blob detection. Difference of gaussian was used by blurring images using gaussian kernels of a range of standard deviation in increasing order. Stacks of the differential images between two successively blurred images form a cube and where blobs are local maxima of intensity. Blobs of noisy objects are avoided by tuning the range of standard deviation used in the process.

Fluorescence Recovery After Photobleaching (FRAP): Hydrogel samples were loaded with 0.5 wt % FITC-dextran (4 kDa). An Inverted Zeiss LSM 780 Laser Scanning Confocal Microscope (Germany) using a Plan-Apochromat 20X/0.8 M27 objective lens was used for FRAP analysis. A pixel dwell time 1.58 s was used. Samples were photobleached with 405 and 488 argon lasers. All lasers were set at 100% intensity for the bleaching. The samples were placed in a sterile 0.16-0.19 mm thick glass bottom μ-dish from MatTek Corporation (MA, USA). The software used for all FRAP tests was the ZEN lite (Zeiss). To avoid any extra noise, the high voltage was limited to be 700 V. Different tests (n=5) were made at different locations of the sample. For each test, 10 control pre-bleach images per second were captured, and bleached the spot with a pixel dwell time of 177.32 s. 390 post-bleach frames were recorded per second to form the recovery exponential curve. The pixel size was set to be 0.83 μm. The diffusion coefficient was calculated as[73]: $D=\gamma_D(\omega^2/4\tau_{1/2})$ where $\gamma_D=0.88$ for circular beams, $\omega$ is the radius of the bleached ROI (12.5 μm), and $\tau_{1/2}$ is the half-time of the recovery. To estimate the mesh size ($\xi$) of our hydrogels, we used the obstruction theory of Amsden et al.:

$$\frac{D}{D_0}=\exp\left(-\pi\left(\frac{r_s+r_f}{\xi+2r_f}\right)^2\right)$$

where D is diffusivity of the solute in the hydrogel, $D_0$ is the diffusivity of the solute within the liquid in the hydrogel (saline-sodium citrate buffer), assumed to be the same as in pure water, $r_s$ is the radius of the solute (3.51 nm for FITC-dextran 4 kDa), $r_f$ is the radius of the polymer chains of the hydrogel the polymer mesh within the hydrogel (estimated to 0.65 nm[74] for the polyacrylamides and 0.51 nm for the PEG[75]) and $\xi$ is the mesh size. The diffusivity ($D_0$) of a solute in a pure liquid is given by the hydrodynamic theory, as defined by the Stokes-Einstein equation, $$D_0 = \frac{k_b T}{6\pi\eta r_s} = 69.91$$

μm2/s where $k_b$ is Boltzmann's constant, T the absolute temperature (20° C.) and η the viscosity (assuming $\eta=0.89\cdot10^{-4}$ Pa·s for SSC).

Scanning Electron Microscopy: SEM images were acquired with an FEI Magellan 400 XHR Microscope with a Beam Voltage of 1 kV. The sample was lyophilized prior to imaging, pressed onto silver paint and sputter-coated with Au:Pd (60:40) before imaging.

Hydrogel protection of electrochemical biosensors. The working electrode (WE) is prepared with 75-μm diameter gold wire (at) and clipped to expose bare gold. Pt wire was bundled with Au electrode, following bundling with Ag/AgCl wire to prevent shorting. No surface roughening is applied. Ag/Ag Cl wires were prepared by incubating silver electrodes in bleach solution, rinsed vigorously with water, and dried. To coat the tip of the exposed gold, 0.5 μL of prepolymer solution was pipetted onto a silicone surface. The gold electrode was dipped into the solution and exposed to 350 nm light, lifting the wire with hydrogel coating off of the hydrophobic surface. Coating was visible by eye. Probes (bare, PEG-hydrogel coated, and F50-C50 hydrogel coated) were incubated into human whole blood at room temperature with 100 mM $FeCN_6$. As the blood had anti-coagulant $Na_2EDTA$, first $CaCl_2$ was added to reach a concentration of 25 mM, then 50 mM for 1 h. Cyclic voltammetry (CV) scanning on the Au wire is performed (potential range: −0.4 to 0.8 V, step size: 1 mV, scan rate: 0.1 V/sec), each with five scans.

Gold, platinum, and silver wires were purchased from A-M Systems Inc (Sequim, WA). 6-Mercapto-1-hexanol and tris(2-carboxyethyl)phosphine were ordered from Sigma Aldrich (St. Louis, MO). EDTA-treated human whole blood for flowing in vitro measurements was purchased from BioIVT (Westbury, NY).

Aptamer Device Fabrication and Functionalization: Aptamer devices comprise of an aptamer "probe" attached at one send to a self-assembled monolayer and the other to a redox-active "reporter" methylene blue. As an analyte of interest approaches, the reporter approaches the electrode, producing a current that can be measured through square wave voltammetry. The kanamycin aptamer probes were synthesized by Biosearch Technologies. Probes were thiolated at the 5' end (with a 6-carbon linker) for self-assembly onto the gold working electrodes (WE) and conjugated with a methylene blue (MB) redox label at the 3' end (with a 7-carbon linker) for charge transfer measurements. The modified DNAs were purified through dual HPLC by the supplier. Upon receipt, the construct was dissolved to 100 μM using UltraPure water (ThermoFischer Scientific Inc.) and frozen at −20° C. in individual aliquots at a volume of 1 μL until use. The working electrode (WE) is prepared with 8 cm pure gold wire (at 75 μm diameter) insulated using heat-shrinkable tubing (Nordson Medical, 103-0325) to define the aptamer immobilization surface. The exposed gold wire has a length of 1~2 mm with an overall surface area range from 0.25~0.5 $mm^2$. No surface roughening is applied. Before immobilizing the aptamer probes, the wire is rinsed with acetone, ethanol, deionized water in a sonicator sequentially, followed by electrochemical cleaning. In the latter, cyclic voltammetry (CV) scanning on the gold wire is performed in 500 and 50 mM sulfuric acid solutions (potential range: −0.4 to 1.5 V, step size: 1 mV, scan rate: 0.1 V/sec), each with three scans. An aliquot of the DNA construct was thawed and reduced for 40 minutes with the addition of 2 μL 100 mM tris(2-carboxyethyl)phosphine at room temperature in dark. The reduced DNA construct is diluted to 1 μM with de-ionized water, and a freshly cleaned gold electrode was immersed for 1 h at room temperature in dark. Next, the sensor is rinsed with de-ionized water for 3 min followed by immersion in 6 mM 6-mercapto-1-hexanol in 1×SSC (saline sodium citrate) buffer for 2 h to passivate the remaining gold surface and remove nonspecifically adsorbed DNA, also at room temperature in dark. The sensor was rinsed with de-ionized water for another 3 min and stored in 1×SSC buffer in 4° C. for 12 h before the application of the hydrogel.

Electrochemical measurements were conducted using an electrochemical analyzer (EmStat Blue, Palm Instruments BV) in square-wave-voltammetry (SWV) mode. As only working and reference electrodes are employed in the device, the input connections for the reference and the counter electrode from the electrochemical analyzer are shorted. The working electrode is scanned in continuous succession with a scan period of 2 seconds, alternating between two SWV frequencies (400 and 60 Hz) at a constant SWV amplitude of 36 mV. Two frequencies are used in order to apply kinetic differential measurements for drift mitigation. As the MB redox peak was typically observed at about −350 mV in our setup, a potential range of −500 to −100 mV (with respect to Ag/AgCl reference) is selected during SWV scan. A custom peak-fitting script was created to fit the SWV measurements with a Gaussian curve on a hyperbolic baseline. Peak currents were then normalized to a baseline peak current to generate the signal gain. All reported gains were obtained via KDM with the difference divided by the average of gains from 400 and 60 Hz signals. Kanamycin monosulfate was ordered in USP grade from Gold BioTechnology, Inc (St. Louis, MO).

Coating of Aptamer with Hydrogel: HEAm and DEAm monomers were purified through basic alumina column. The hydrogel is applied to the sensing gold wire through capillary force, in which the sensor is dipped into the unlinked hydrogel solution for 5 sec and removed immediately. The hydrogel is then polymerized by applying 365 nm UV light for 30 sec. No reduction in the MB peak current is observed after UV application. An Ag/AgCl reference electrode (a 75 μm diameter Ag wire chlorinated in bleach overnight) is attached to the hydrogel-coated gold wire using heat shrinkable tubing. The final device is placed in 1×SSC buffer at 4 degrees Celsius overnight before use.

Live animal studies: using Sprague-Dawley rats were performed under Stanford IACUC protocol number 33226. All rats used in this work were purchased from Charles River Laboratories at a weight of 300-350 g (all male). The rats were anesthetized using isoflurane gas inhalation (2.5%) and monitored continuously. After exposing both femoral veins, a 20 G catheter was implanted into the left femoral vein for sensor probe insertion whereas a 22 G catheter was implanted into the right femoral vein for drug infusion. 0.1-0.3 mL of heparin (1000 U/mL, SAGENT Pharmaceuticals, Schaumburg, IL, USA) were immediately infused through the catheter to prevent blood clotting. The sensor was secured in place with surgical suture after the insertion. A sequence of bolus injection is performed manually using a 5 mL syringe. In each injection, 100 μL of 100 mM kanamycin in PBS buffer was injected through the sensor-free catheter. At the end of the experiments, animals were euthanized by exsanguination while under general anesthesia.

Nanoindentation: Young's modulus measurements of the hydrogels were performed using a Piuma nanoindenter (Optics11, Netherlands). A probe from the same manufacturer with a stiffness of 38.8 N/m and a tip radius of 27.0 μm was used. Calibration was conducted as on glass under wet conditions as per the manufacturer's instructions. Each sample was immersed in a sterile saline buffer solution before the nanoindentation experiments in order to perform force versus distance measurements were conducted under wet conditions. The indentation depth was fixed to be <1 μm in order to avoid bottom effects. At least 8 force curves were used to determine the local Young's modulus of each sample, using the Optics11 Nanoindenter V2.0.27 software. The results are shown as mean±standard error of the mean. A Hertzian contact model parameter was used for the fit of the curves assuming that the Poisson's ratio of the samples is $v=0.5$.

Rheological Characterization: Oscillatory rheology measurements were performed with a TA Instruments AR-G2 rheometer. Amplitude sweeps were conducted at a frequency of 10 rad/s from 0.1-100%. Frequency sweeps were conducted at 0.1% strain from 0.1-100 rad/s. All tests were performed at 25° C. using an 8 mm parallel plate geometry.

Tensile Test: Tensile strength measurements were performed with an Instron series 5560A with 100 N load cell. Tensile tests were conducted at 0.2 mm/s at room temperature.

Statistical analysis: All values of significance were determined using a one-way ANOVA with Prism GraphPad 6 software. Post hoc comparisons were performed with Tukey's multiple

What is claimed is:

1. An anti-fouling hydrogel coating, comprising:

a polymerized composition containing monomers, alone or in combinations, having a combined weight ratio of 100% with a general form of:

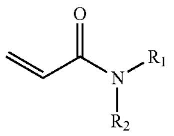

wherein R1 and R2 are substituents of monomers selected from the group consisting of 4-acryloylmorpholine (H), N-[3-(dimethylamino) propyl]meth-acrylamide (I) and N-isopropylacrylamide (K), wherein R1 and R2 can the same for H and I, wherein R1 and R2 cannot be the same for K.

2. The anti-fouling hydrogel coating as set forth in claim 1, wherein the anti-fouling hydrogel coating has a relatively better antifouling properties in terms of blood platelet adhesion, tested after protein serum adhesion, than antifouling properties in terms of blood platelet adhesion for anti-fouling hydrogels with PEG or HEMA.

3. The anti-fouling hydrogel coating as set forth in claim 1, further comprising a medical device, an implant or a material intended for contact with blood or bodily fluids, wherein the anti-fouling hydrogel coating is coated on the medical device, the implant or the material intended for contact with blood or bodily fluids to prevent fouling.

4. The anti-fouling hydrogel coating as set forth in claim 1, wherein a first monomer and a second monomer together making up the combined 100% weight ratio having individual weight ratios of at least binary combinations H, I, or K.

5. An anti-fouling hydrogel coating, comprising:

a polymerized composition containing monomers, alone or in combinations, having a combined weight ratio of 100% with a general form of:

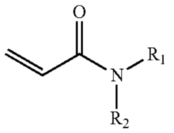

wherein R1 and R2 are substituents of monomers selected from the group consisting of N,N-diethylacrylamide (C), N-(3-methoxypropyl) acrylamide (D), N-hydroxymethyl-acrylamide (E), N-hydroxyethyl-acrylamide (F), N-[Tris(hydroxymethyl)methyl]acrylamide (G), 4-acryloylmorpholine (H), N-[3-(dimethylamino) propyl]methacrylamide (I), and N-isopropylacrylamide (K), wherein a first monomer and a second monomer together making up the combined 100% weight ratio having individual weight ratios of at least binary combinations C, D, E, F, G, H, I, or K, wherein R1 and R2 can the same for C, D, E, G, H and I, and wherein R1 and R2 cannot be the same for F, and K.

6. The anti-fouling hydrogel coating as set forth in claim 5, wherein the anti-fouling hydrogel coating has a relatively better antifouling properties in terms of blood platelet adhesion, tested after protein serum adhesion, than antifouling properties in terms of blood platelet adhesion for anti-fouling hydrogels with PEG or HEMA.

7. The anti-fouling hydrogel coating as set forth in claim 5, further comprising a medical device, an implant or a material intended for contact with blood or bodily fluids, wherein the anti-fouling hydrogel coating is coated on the medical device, the implant or the material intended for contact with blood or bodily fluids to prevent fouling.

* * * * *